US009928377B2

(12) United States Patent
Narayanaswamy et al.

(10) Patent No.: US 9,928,377 B2
(45) Date of Patent: Mar. 27, 2018

(54) SYSTEMS AND METHODS OF MONITORING AND CONTROLLING ENTERPRISE INFORMATION STORED ON A CLOUD COMPUTING SERVICE (CCS)

(71) Applicant: netSkope, Inc., Los Altos, CA (US)

(72) Inventors: Krishna Narayanaswamy, Los Altos, CA (US); Ravi Ithal, Los Altos, CA (US); Steve Malmskog, Los Altos, CA (US); Shankaran Gnanashanmugam, Los Altos, CA (US); Arjun Sambamoorthy, Los Altos, CA (US); Chetan Anand, Los Altos, CA (US); Prashanth Arun, Los Altos, CA (US)

(73) Assignee: netSkope, Inc., Los Altos, CA (US)

( * ) Notice: Subject to any disclaimer, the term of this patent is extended or adjusted under 35 U.S.C. 154(b) by 191 days.

(21) Appl. No.: 14/835,640

(22) Filed: Aug. 25, 2015

(65) Prior Publication Data

US 2016/0275303 A1    Sep. 22, 2016

Related U.S. Application Data

(60) Provisional application No. 62/135,656, filed on Mar. 19, 2015.

(51) Int. Cl.
*G06F 21/62*    (2013.01)
*H04L 9/32*    (2006.01)
(Continued)

(52) U.S. Cl.
CPC ........ *G06F 21/6218* (2013.01); *G06F 21/554* (2013.01); *G06F 21/602* (2013.01);
(Continued)

(58) Field of Classification Search
None
See application file for complete search history.

(56) References Cited

U.S. PATENT DOCUMENTS 7,272,646 B2 *  9/2007  Cooper ................ H04L 41/069
                                                        709/223
7,478,434 B1    1/2009  Hinton et al.
(Continued)

FOREIGN PATENT DOCUMENTS

| EP | 2378455 A2 | 10/2011 |
| EP | 2544117 A1 | 1/2013 |
| WO | 2015002875 A1 | 1/2015 |

OTHER PUBLICATIONS

NETSKOPE, "The 5 Steps to Cloud Confindence", Jan. 1, 2014, XP055312652,10 pages. Retrieved from the nternet: <URL:http://www.dgcompany.nl/downloads/The> 5 Steps to Cloud Confidence.pdf.*

(Continued)

*Primary Examiner* — Trang Doan
(74) *Attorney, Agent, or Firm* — Haynes Beffel & Wolfeld LLP; Ernest J. Beffel, Jr.

(57) ABSTRACT

A computer-implemented method is described to monitor and control enterprise information stored on a cloud computing service (CCS). The method includes using a cross-application monitor to detect a cloud computing service (CCS) application programming interface (API) in use and a function or an activity being performed via the CCS API. The method also includes determining the function or the activity being performed via the CCS API by parsing a data stream based on the CCS API and identifying content being transmitted to the CCS. The method further includes applying a content inspection rule to find strings and interrelated strings in the content that are subject to content control and triggering a security action responsive to finding the strings (Continued)

and interrelated strings subject to content control in the parsed stream.

20 Claims, 18 Drawing Sheets

(51) Int. Cl.
| | |
|---|---|
| *H04L 29/06* | (2006.01) |
| *H04L 9/08* | (2006.01) |
| *G06F 21/55* | (2013.01) |
| *H04W 12/08* | (2009.01) |
| *H04L 29/08* | (2006.01) |
| *G06F 21/60* | (2013.01) |

(52) U.S. Cl.
CPC .......... *G06F 21/6209* (2013.01); *H04L 9/083* (2013.01); *H04L 9/0861* (2013.01); *H04L 9/0866* (2013.01); *H04L 9/0869* (2013.01); *H04L 9/3236* (2013.01); *H04L 63/0281* (2013.01); *H04L 63/062* (2013.01); *H04L 63/123* (2013.01); *H04L 63/145* (2013.01); *H04L 63/1416* (2013.01); *H04L 63/1458* (2013.01); *H04L 67/1097* (2013.01); *H04W 12/08* (2013.01); *H04L 2463/061* (2013.01)

(56) References Cited

U.S. PATENT DOCUMENTS

| | | | |
|---|---|---|---|
| 8,572,757 B1 | 10/2013 | Stamos et al. | |
| 8,856,869 B1* | 10/2014 | Brinskelle | H04L 63/08 726/12 |
| 9,565,202 B1* | 2/2017 | Kindlund | H04L 63/1441 |
| 2003/0135465 A1 | 7/2003 | Lee et al. | |
| 2004/0205360 A1* | 10/2004 | Norton | H04L 63/0227 726/23 |
| 2006/0075481 A1* | 4/2006 | Ross | H04L 63/0263 726/13 |
| 2007/0006293 A1* | 1/2007 | Balakrishnan | H04L 63/0245 726/13 |
| 2009/0022319 A1 | 1/2009 | Shahaf et al. | |
| 2009/0044260 A1* | 2/2009 | Niglio | H04L 63/0428 726/9 |
| 2011/0264906 A1 | 10/2011 | Pourzandi et al. | |
| 2011/0277027 A1* | 11/2011 | Hayton | H04L 63/0815 726/8 |
| 2012/0023323 A1* | 1/2012 | Kent, Jr. | G06Q 10/107 713/150 |
| 2012/0106366 A1* | 5/2012 | Gauvin | H04L 43/0835 370/252 |
| 2012/0144189 A1 | 6/2012 | Zhong | |
| 2012/0151551 A1* | 6/2012 | Readshaw | G06F 21/55 726/1 |
| 2012/0204260 A1* | 8/2012 | Cecil | G06F 21/554 726/22 |
| 2013/0006865 A1 | 1/2013 | Spates | |
| 2013/0055342 A1* | 2/2013 | Choi | G06F 21/577 726/1 |
| 2014/0026182 A1* | 1/2014 | Pearl | G06F 21/60 726/1 |
| 2014/0259190 A1* | 9/2014 | Kiang | G06F 21/6218 726/30 |
| 2015/0019870 A1 | 1/2015 | Patnala et al. | |
| 2015/0135302 A1* | 5/2015 | Cohen | H04L 67/2823 726/12 |
| 2015/0312227 A1 | 10/2015 | Follis et al. | |
| 2016/0094483 A1* | 3/2016 | Johnston | H04L 47/827 709/226 |

OTHER PUBLICATIONS

Office 365 Team, "Office 365—Our Latest Innovations in Security and Compliance," Microsoft Inc., Oct. 28, 2014, 6 pages, Retrieved from the Internet: <http://blogs.office.com/2014/10/28/office-365-latest-innovations-security-compliance/> [Apr. 10, 2015].

Akana, "API Security: A Guide to Securing Your Digital Channels", May 15, 2015, XP055312513, Sections 2 and 3, Retrieved from the Internet: <http://resource.akana.com/white-papers/api-security-a-guide-to-securing-your-digital-channels.

Jose Luiz Berg et al, "Issue Sepember/October API Governance and Management by Longji Tang, Mark Little LXXXVI Security and Identity Management Applied to SOA—Part II A Look at Service-Driven Industry Models Contents", Service Technology Magazine, Sep. 1, 2014, pp. 1-45, XP055243185, Retrieved from the Internet: URL:http://servicetechmag.com/system/application/views/I86/ServiceTechMag.com_Issue86_online.pdf.

NETSKOPE, "The 5 Steps to Cloud Confindence", Jan. 1, 2014, XP055312652, 10 pages, Retrieved from the Internet: <URL:http://www.dgcompany.nl/downloads/The> 5 Steps to Cloud Confidence.pdf.

Axway, Comprehensive API and SOA 1-25 Security, Mar. 18, 2015, XP055310645, 3 Pages, Retrieved from the Internet: http://www.axway.com/sites/default/files/brief_files/axway_solutionbrief_api_soa security_en.pdf>.

Akana, "API Security: A Guide to Securing Your Digital Channels", Mar. 15, 2015, XP055312513, Sections 2 and 3, Retrieved from the Internet: <http://resource.akana.com/white-papers/api-security-a-guide-to-securing-your-digital-channels.

Akana, "API Gateway: Key Security Features", Mar. 10, 2015, 2 pages, XP055312562, Retrieved from the Internet: http://resource.akana.com/datasheets/api-gateway-security-features.

Jose Luiz Berg et al, "Issue September/October API Governance and Management by Longji Tang, Mark Little LXXXVI Security and Identity Management Applied to SOA—Part II A Look at Service-Driven Industry Models Contents", Service Technology Magazine, Sep. 1, 2014, pp. 1-45, XP055243185, Retrieved from the Internet: URL:http://servicetechmag.com/system/application/views/I86/ServiceTechMag.com_issue86_online.pdf.

NETSKOPE, "The 5 Steps to Cloud Confindence", Sep. 11, 2014, XP055312652, 10 pages, Retrieved from the Internet by EPO: <URL:http://www.dgcompany.nl/downloads/The 5 Steps to Cloud Confidence.pdf; available as of Nov. 14, 2017 via Archive.Org from the home page following the downloads link of dgcompany.nl.

WO 2016186703—International Search Report dated Mar. 24, 2017, 7 pages.

WO 2016186703—Written Opinion of the International Search Authroity dated Mar. 27, 2017, 13 pages.

U.S. Appl. No. 14/835,632—First Action Interview Pilot Program Pre-Interview Communication dated May 31, 2017, 9 pages.

U.S. Appl. No. 14/835,632—First Action Interview Office Action dated Sep. 5, 2017, 26 pages.

NETSKOPE, "The 5 Steps to Cloud Confidence", Version 1, Oct. 3, 2013, 8 pages.

NETSKOPE, "The 5 Steps to Cloud Confidence", Version 2, Jan. 29, 2014, 10 pages.

NETSKOPE, "The 5 Steps to Cloud Confidence", Version 3, Jun. 17, 2014,10 pages.

NETSKOPE, "The 5 Steps to Cloud Confidence" comparison between Sep. 11, 2014 Version 4 and Jan. 29, 2014 Version 2, Aug. 15, 2017, 12 pages.

* cited by examiner

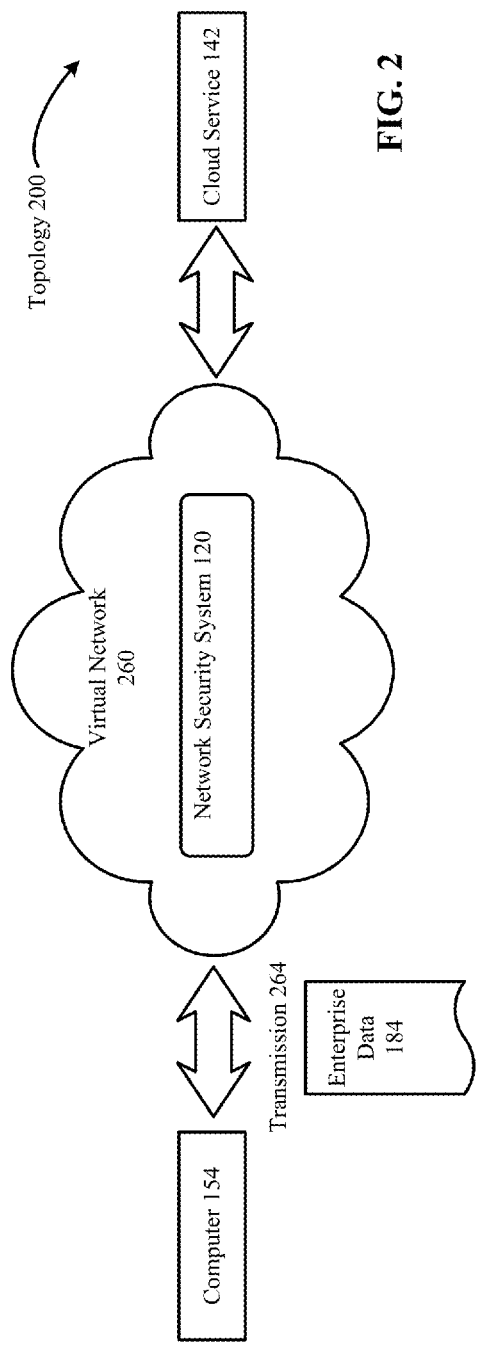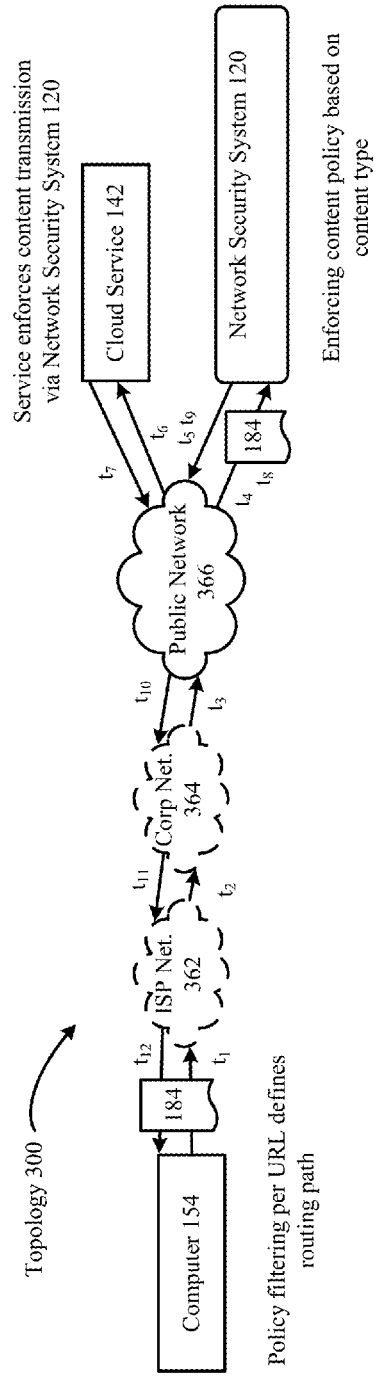

Create Content Policy — Interface 900

| Identity | Application | Cloud Confidence | Content Monitor | Activity | Action | Set Policy |
|---|---|---|---|---|---|---|

- ○ Finance
- ○ Legal
- ○ PII
- ⊘ PCI
- ○ PHI
- ○ Profanity – EN
- ○ Profanity – FR
- ○ Profanity – AG
- ○ Profanity – SP
- ○ Religion
- ○ Ethnicity
- ○ Medical – Branded Rx Names
- ○ Custom – Reimbursement Codes
- ○ Custom – Medical Keywords
- ○ Custom – IP Keywords

Content Policy Overview

| | |
|---|---|
| Users | All |
| Service Categories | Cloud Storage |
| Cloud Confidence | Medium or High or Low |
| Content-Level Activity | Upload or Download |
| Content Inspection | PHI |
| Action | Encrypt |

[Cancel]   [Back] [Next]

Interface 1000

Edit Policy: (1) – Safe Enablement / Encrypt / Compliance – ePHI and mHealth – Mobile Data Upload - Encrypt

| Identity | Application | Cloud Confidence | Content | Activity | Action | Set Policy |

🔍 Groups

Showing 1-100 items

☐ IT

Groups
Users
△ Devices
△ Geolocation

Content Policy Overview

Groups — IT
Users — gert.saber@seskope.com
OS — Android or iOS or Mac or Windows
Service Instances — Box: Netskope-Corp
Standard Pattern — HIPAA
Activities — Upload
Action — Encrypt

[Cancel]   [Back]   [Next]

Edit API Connector Policy: look for profanity in the cloud

| Account | Folders | File Options | Content Profile | Activity | Action | Set Policy |
|---------|---------|--------------|-----------------|----------|--------|------------|

Interface 1100

Select an Service: [Google Drive ▼]

Select an Account: [nammazone.com ▼]

Content Policy Overview

Service Account      google-nammazone.com

Folders              All folders of all users - true

File Options         All files – true
                     File type – all
                     Scan already uploaded files - true Standard Pattern     Profanity Action               Alert

[Cancel]                                    [Back] [Next]

FIG. 11

Edit Policy: Encrypt filed uploaded to Google Drive

| Identity | Application | Cloud Confidence | Action | Activity | Updates | Set Policy |

○ alert
○ block
○ bypass
● encrypt

Content Policy Overview

Service Instances    Google Drive: demo.netskope.com

Activities           Upload

Action               Encrypt

[Cancel]                                    [Back]  [Next]

Interface 1800

FIG. 18

SYSTEMS AND METHODS OF MONITORING AND CONTROLLING ENTERPRISE INFORMATION STORED ON A CLOUD COMPUTING SERVICE (CCS)

This application claims the benefit of U.S. Provisional Application No. 62/135,656, entitled "Systems and Methods of Monitoring and Controlling Enterprise Information Stored on a Cloud Computing Service (CCS)", filed Mar. 19, 2015. This application is related to a PCT Application that claims the benefit of this application, PCT/US2016/014197, entiled "Systems and Methods of Monitoring, Controlling and Per-document Encryption of Enterprise Information Stored on a Cloud Computing Service (CCS)", filed Jan. 20, 2016

INCORPORATIONS

The following materials have been incorporated by reference in this filing:

"SECURITY FOR NETWORK DELIVERED SERVICES", U.S. Prov. App. No. 61/773,633, filed on Mar. 6, 2013, "SECURITY FOR NETWORK DELIVERED SERVICES", U.S. Non Prov. application Ser. No. 14/198,499, filed on Mar. 5, 2014, "SECURITY FOR NETWORK DELIVERED SERVICES", U.S. Non Prov. application Ser. No. 14/198,508, filed on Mar. 5, 2014.

"SYSTEMS AND METHODS OF MONITORING AND CONTROLLING ENTERPRISE INFORMATION STORED ON A CLOUD COMPUTING SERVICE (CCS)", U.S. Prov. App. No. 62/135,656, filed on Mar. 19, 2015, "Data Loss Prevention and Monitoring in the Cloud" by netSkope, Inc., "The 5 Steps to Cloud Confidence" by netSkope, Inc., "Netskope Active Cloud DLP" by netSkope, Inc., "Repave the Cloud-Data Breach Collision Course" by netSkope, Inc., and "Netskope Cloud Confidence Index™" by netSkope, Inc.

FIELD OF THE TECHNOLOGY DISCLOSED

The technology disclosed generally relates to providing visibility, control and data security for network delivered services, and more particularly relates to security and regulatory compliance of cloud services transactions and traffic.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Data is often the lifeblood of any business and it is critical that it is effectively managed, protected, and meets compliance needs. Protecting data in the past was focused primarily on on-premise scenarios, but now with the increased adoption of cloud services, companies of all sizes are now relying on the cloud to create, edit, and store data. This presents new challenges. Despite its benefits, the cloud also makes it easy for people to lose sensitive corporate data. For one thing, people can access cloud services from multiple devices more easily. Another is that the cloud services make it easy to share data, including with people outside of an organization. For these reasons, it is easy for data to get out of an organization's control.

Also, as the number of cloud services increases exponentially, there are hundreds of ways data can leak. Employees might be attach a wrong file while sending emails, hit the send button too early, not be careful when rushing to a deadline, or share data and collaborate with people outside of their organization. The native cloud storage sync clients also pose a significant risk to organizations. A continuous sync takes place between the end point and the cloud service without employees realizing they are leaking confidential company information. In the case of disgruntled workers, the cloud services are making it super easy for them to steal intellectual property.

Accordingly, it is imperative to facilitate the use of cloud services so people can continue to be productive and use the best tools for the job without compromising sensitive information such as intellectual property, non-public financials, strategic plans, customer lists, personally identifiable information belonging to customers or employees, and the like.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 2 shows the virtual network topology of a system in accordance with an implementation.

FIG. 3 depicts a more detailed network topology and data flow of a system in accordance with an implementation.

FIG. 9 illustrates one implementation of a content-monitor-interface that can be used to set fine-grained content policies.

FIG. 10 shows one implementation of a content-monitor-interface that can be used to make fine-grained content policies applicable to specific entities of an organization.

FIG. 11 depicts one implementation of a content-monitor-interface that can be used to apply fine-grained content policies applicable to specific cloud services.

FIG. 18 illustrates one implementation of a content-monitor-interface that can be used to set fine-grained content policies.

DESCRIPTION

Introduction

Figure 1:
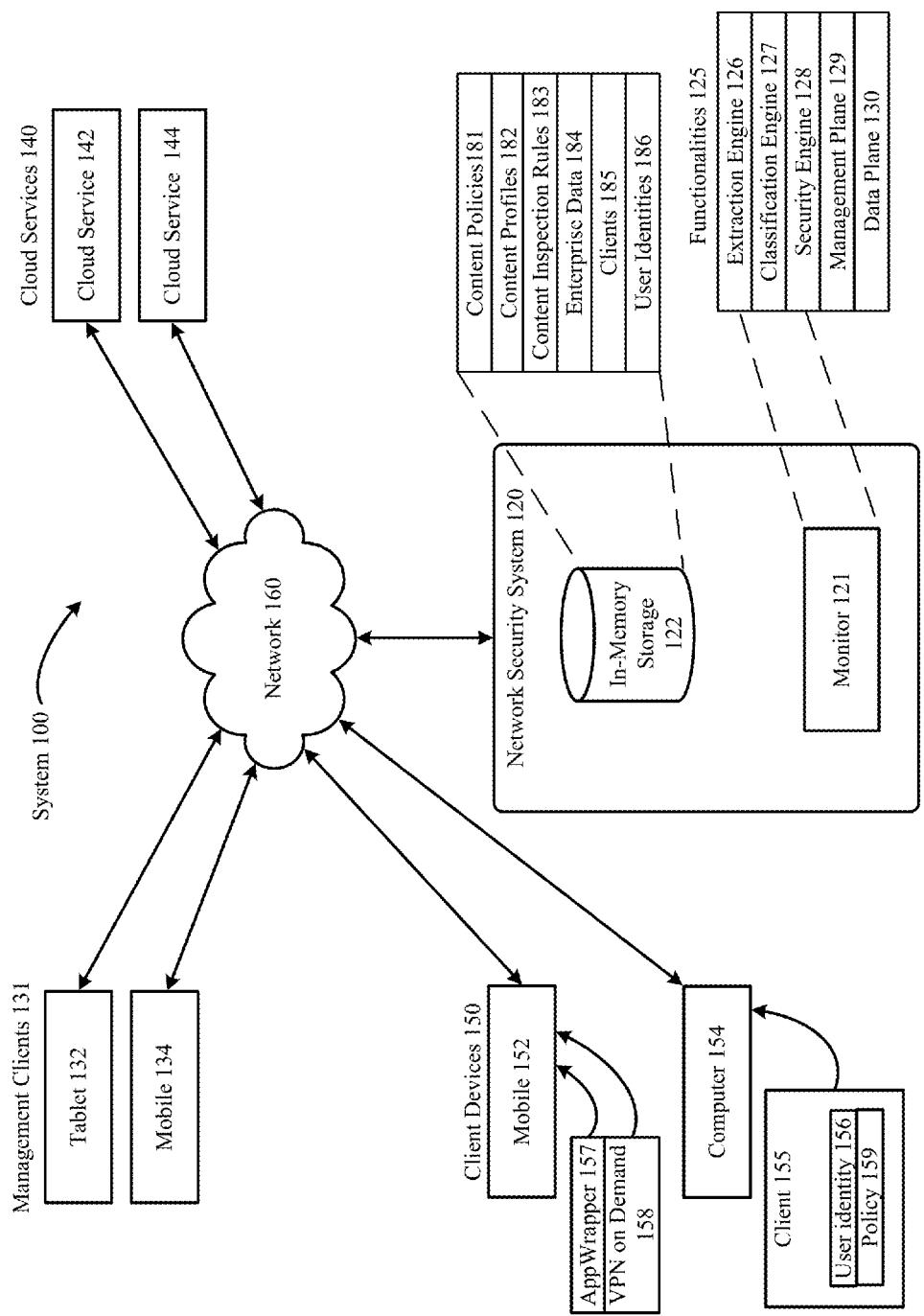
FIG. 1 illustrates an architectural level schematic of a system in accordance with an implementation.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an introduction describing some of the problems addressed by various implementations will be presented, followed by an explanation of terminology that will be used throughout the discussion. Then, a high-level description of one implementation will be discussed at an architectural level. Next, the algorithms used by some implementations to provide security are discussed. Lastly, more detailed architectures for implementing the system, together with filtering rules, models, and application definitions, are discussed.

We describe a system and various implementations for providing security for network delivered services. The technology disclosed provides visibility into the cloud services interfacing with an organization's network. It allows organizations to institute granular policies that make interaction with those services safe, compliant, and highly efficient. In addition, it allows the organizations to identify risky behavior and potential data loss or breach.

With an increasing number of cloud services coming onto the scene, organizations are grappling with the technical problem of monitoring and controlling transfer of critical enterprise data to these services. Organizations are concerned that due to the lack of a "cloud gatekeeper", they can no longer attest to the accuracy of their security and compliance claims.

Organizations have adopted cloud computing services (CCS) in a big way. Today accounting for 23 percent of IT spend, cloud computing has accelerated because it allows people to get their jobs done more quickly, easily, and flexibly than traditional computing tools. Cloud services, the most visible and adopted segment of cloud computing, have proliferated in enterprises with thousands of cloud services being used in enterprises today.

Cloud services are increasingly common in nearly every kind of enterprise. Sometimes this is because they are cheaper to buy and operate. Other times it's because people want to be nimble, deploying a service faster and taking advantage of the latest product features sooner than they would with on-premises software. And other times it's because people don't want to coordinate across the many gatekeepers—operations, hardware, networking, and security—required to make a software rollout successful.

While IT has ownership or responsibility for some cloud services, people are now more than ever empowered to go outside of IT and deploy their own service commonly referred to as "shadow IT". This means they are procuring, paying for, managing, and using these services without IT's involvement. This means that there is no way for IT to consistently manage and secure all of the cloud services running across the organization, whether "shadow IT" or sanctioned, or to enforce security or compliance controls.

Whether shadow or sanctioned, cloud service usage is growing and C-suites, boards of directors, and audit committees around the world are beginning to ask whether the cloud technologies in their environment are safe, compliant with business policies, and perform according to vendor service-level agreements. Accordingly, it is desirable that IT can confidently answer these questions and assuage these concerns.

Moreover, data leaks can cause an organization loss of millions of dollars. When sensitive information is leaked companies spend millions of dollars to conduct internal investigations and fix existing infrastructure. Also, dealing with the damaged reputation and external audits and litigations can stay with the company for a long period of time. A leak can be subjected to more long-term costs for those who sell and depend on intellectual property. When companies lose intellectual property, it directly and immediately impacts R&D costs and revenue.

Forrester Research estimates that the average data leak results in $1.5 million in economic damage. Ultimately, the cost of the leak is determined by the size and nature of the organization, the sensitivity of the data leaked, and the size of the leak itself. According to Forrester research, when an organization loses customer data the total cost per record is $218. A simple data leak that results in the loss of 100,000 customer records can turn into a direct and immediate cost of millions. See *Trends: Calculating the Cost of a Security Breach*. Forrester Research, Inc. Apr. 10, 2007.

The Ponemon Institute conducted a survey sponsored by Netskope™ of 613 IT and security professionals, and found that just over half of them (51 percent) believed the use of cloud services increased the likelihood of a data breach. 90 percent of the respondents said that the backup and storage of sensitive and/or confidential information in the cloud services increased by 50 percent within an organization over a 12-month period would increase the probability of a data breach. The study used information like this to calculate the increased cost of a data breach due to using the cloud services more. On average, a major breach will cost an organization around $2.37 million (£1.41 million), but increased use of cloud services can raise this by an estimated 310 percent, to $7.34 million. See *Data Breach: The Cloud Multiplier Effect*, Jun. 4, 2014.

When confronted with an unknown technology, sometimes organizations are inclined to shut it down. That's because many of the tools IT has used to detect and remediate rogue technology are binary, so they allow organizations to say only "yes" or "no". The data loss prevention (DLP) solutions available in the market have similar shortcomings where they respond to attempts of unauthorized movement of data by completely blocking the movement when a policy requires doing so. In addition, existing DLP solutions lack user activity-based context and as a result flag too many false positives.

The technical solution disclosed herein solves the technical problem of data leaks and breaches. In particular, it allows organizations to use nearly all of the cloud services available in the market, and then selectively authorize certain activities to make the usage of those services acceptable to the organizations from a security and compliance standpoint. In particular, the solution identifies activities that pertain to transmission of sensitive data based on evaluating the content details (e.g. content-type, file, or object name) against one or more content profiles, according to one implementation. The content profiles (e.g. personally-identifiable information, payment card information, and electronic personal health information) include a combination of custom data identifiers and industry-standard data identifiers that provide context and activity aware detection of sensitive data.

The technology disclosed enforces, in real-time, granular policies based on the content profiles to prevent potential data leakage scenarios and allow continuous compliance. In another implementation, the cloud services can be retroactively evaluated against the content profiles for discovering sensitive data that may have already been transmitted. In some implementations, the enforcement is global and applies to all cloud services interfacing with the organization's network. In other implementations, the enforcement applies to individual cloud services or to a category of cloud services.

Also, it should be mentioned that another feature of implementations is a Cloud confidence Index™ (CCI) that assesses a cloud service's enterprise-readiness based on objective criteria, and assigns an overall score. In particular, CCI measures the enterprise readiness of cloud services by taking into various attributes of the cloud services. The following list of cloud service attribute is exemplary rather than exhaustive and includes: encryption policies, auditability and business continuity, disaster management policies, number of data centers, compliance certifications (e.g. SOC2) of the data centers, identity and access control, file sharing, data classification, audit and alert, data access logs preservation, password policy, forfeiture policies, published data recovery plan, and ability to proxy traffic for inspection and security controls.

Some implementations include assigning a score of 0-100 to each cloud service interfacing with an organization's network. Further, based on the assigned score, the cloud services are categorized into different cloud confidence levels such as excellent, high, medium, low, or poor.

Other implementations include CCI grouping the cloud services into a plurality of categories, including cloud storage, collaboration, finance and accounting, customer relationship management (CRM), human resources, and software development.

In one implementation, CCI can be used as a matching criteria in the real-time content policies, e.g.:
Block the upload of personally-identifiable information to cloud storage services with a CCI score of "medium" or below.
Don't let users share content in cloud storage services rated medium or low or poor. In another implementation, cloud services rated medium or below can be considered non enterprise-ready and risky.

In yet another implementation, organizations can customize CCI by adjusting the index's input weightings to match organization's requirements and criteria.

Some examples of monitoring and controlling enterprise data using granular polices defined based on content profiles include:
Allow users in sales to share any public collateral while preventing them from downloading content deemed confidential from a cloud storage service to an unmanaged system.
Alert IT if any user in investor relations shares content from a finance/accounting service with someone outside of the organization.
Block any user located outside of the U.S. from downloading contacts from any CRM service.
Only allow data uploads to services that have a CCI score of medium or above, and block uploads to the rest.
Encrypt all content matching my confidential DLP profile in cloud services.
Block download of any .exe file from a cloud storage service.
Alert on the download of PII from any HR cloud service to a mobile device.

In another implementation, the technology disclosed tracks movement of the sensitive data across the cloud services by maintaining an audit trail of the transmitted content. For instance, let's say that in the course of performing analytics, an organization's IT uncovers suspicious activity. Analysts suspect that just days before leaving the organization for a competitor, an employee has exfiltrated data by downloading proprietary data from one of the company's cloud services and then uploading the file into a cloud storage service that he accessed with his personal login credentials. Using the technology disclosed, IT can construct a forensic audit trail showing every cloud service action for that user leading up to and immediately following the incident. This would enable IT not only to uncover suspicious behavior, but also to prove a breach occurred and clearly demonstrate malicious or criminal activity.

Upon detecting any event or deviation from a baseline, such as transmission of data deemed sensitive given a content profile, the technology disclosed can trigger a plurality of security actions, including block, alert, bypass, quarantine, coach, initiate a workflow to remediate, record, seek justification, report on the out-of-compliance event or activity, or content encryption. The type of the security action can be based on at least one of the type of the content policies, the content-level activity being performed, and the content-type. In other implementations, certain off-line inspections can be triggered as security actions, such as changing the ownership of sensitive data.

In particular, the technology disclosed provides a safe cloud adoption for their customers and business by protecting data in a fine-grained context, including user group, location, device, service or category, activity, and content. Unlike solutions for which encryption for the cloud services is an all-or-nothing proposition; the technology disclosed allows companies to narrow the aperture of data that needs protection so that they can target the real risks in their organizations without having to necessarily encrypt everything.

In one implementation, the technology disclosed uses AES 256-bit encryption for the enterprise data being uploaded to, downloaded from, or discovered within cloud services. In addition to having fine-grained contextual controls, a company can also enable encryption for content that matches the organization's data loss prevention (DLP) profile, including personally-identifiable information, electronic personal health information, payment card information, profanity, and even custom regular expressions defined by the organization.

The following is a sample list of some of the encryption-related use cases that can be implemented using the technology disclosed:
A bio-pharmaceutical company can enforce a policy that says any file containing electronic personal health information should be encrypted upon upload to any data and analysis cloud service.
An investment bank can enforce a policy that says any existing folder in a cloud service containing mergers and acquisitions (M&A) data based on the bank's custom regular expression profile should be encrypted, and can only be shared within a collaboration group.

An insurance company can enforce a policy that says any file being uploaded by an insurance adjuster from a mobile device into a cloud storage service should be encrypted.

Using the technology disclosed, an organization's IT can answer compliance-oriented questions based on the organization's business operations and regulations, including:

"Who from my call center in Bulgaria is accessing my CRM system, and what specifically are they doing?"

"Who from my Investor Relations group is sharing docs from our cloud storage app during the company's 'quiet period'?"

"Has any non-HR manager downloaded salary data in any cloud app in the past three months?"

"Is there any excessive downloading, uploading or sharing that could signal a data breach?"

In more exemplary implementations, the technology disclosed can allow the organizations to:

Enable the use of cloud services, but prevent sharing of data with people outside of the company.

Disallow file uploads to cloud storage services that contain highly sensitive data or intellectual property that, if ever leaked, stolen, or modified, could cause serious damage to the organization.

Allow people in the HR and finance groups worldwide to access HR or finance/accounting services, but block anyone outside of the U.S. from downloading salary information.

Encrypt sensitive content in context as its being uploaded or when it's already resident within cloud services.

Examples of systems, apparatus, and methods according to the disclosed implementations are described in an information technology context. In other instances, the technology disclosed can be applied to fraud detection, telecommunications systems, financial systems, security trading, banking, business intelligence, marketing, mining, energy, etc. Other services are possible, such that the following examples should not be taken as definitive or limiting either in scope, context, or setting.

The technology disclosed relates to monitoring and controlling enterprise information stored on a cloud computing service (CCS). The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, a cloud service, sometimes also referred to as a cloud computing service (CCS), refers to a network cloud service or application, web-based (e.g. accessed via a uniform resource locator (URL)) or native, such as sync clients. Examples include software as a service (SaaS) offerings, platform as a service (PaaS) offerings, and infrastructure as a service (IaaS) offerings, as well as internal enterprise applications that are exposed via URLs. Examples of common cloud services today include Salesforce.com, Box, Dropbox, Google Apps, Amazon AWS, Microsoft Office 365, Workday, Oracle on Demand, Taleo, Yammer, and Concur. Cloud services provide functionality to users that is implemented in the cloud and that is the target of policies, e.g. logging in, editing documents, downloading bulk data, reading customer contact information, entering payables, deleting documents, in contrast to the offerings of a simple website and ecommerce sites. Note that some consumer facing websites, e.g. Facebook and Yammer, which offer social networks are the type of cloud service considered here. Some services, e.g. Google's Gmail can be a hybrid with some free users using the application generally while other corporations use it as a cloud service. Note that implementations can support both web browser clients and application clients that use URL-based APIs. Thus, using Dropbox as an example, user activity on the Dropbox website, as well as activity of the Dropbox client on the computer could be monitored.

As used herein, the term policy, sometimes also referred to as a policy definition or policy data or content policy refers to a machine-readable representation of flow control and content control requirements for cloud services. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a cloud service, e.g. where a corporation hosts a service and requires visiting customers to adhere to the policy for use. Of particular note is that the policies considered herein are capable of being sensitive to the semantics of a cloud application, which is to say a policy can differentiate between logging in to a cloud service from, say, editing documents on the cloud service.

Context is important for understanding usage; for an entity, the collection of dozens or hundreds of individual policies (e.g. log bulk downloads, prohibit editing documents on the service, only allow bulk downloads for users who are in the "Vice President" group) is referred to singularly as one policy, or one policy definition. Thus, a system supporting multiple entities will generally have one policy per entity, each made up of dozens or hundreds of individual flow control and content control policies. Similarly, as discussed infra, the policy that is transferred to individual computers can be a subset of a full corporate policy, e.g. solely a machine-readable representation of the URLs of interest, as opposed to the full policy specification for each URL describing the flow control and/or content manipulations.

Portions of the specification may make distinctions between two types of client devices used by users to access cloud services. The primary distinction is between the mechanisms for coupling the client device to the network security system. In relation to client devices, the term "computer" will refer to more open systems where the network security system can more directly install software and modify the networking stack. Similarly, in relation to client devices, the terms "mobile" or "tablet" will refer to more closed systems where the network security system options for modifying the network stack are more limited. This terminology mirrors the situation today where computer-client devices running Mac OS X, Windows desktop versions, Android, and/or Linux can be more easily modified than mobile or tablet devices running iOS, and/or Windows Mobile. Thus, the terminology refers to how third-party operating system vendor limitations are addressed to provide access to the network security system as opposed to a fundamental technical difference between the types of client devices. Further, if mobile OS vendors open their systems further, it is likely that the distinction could be eliminated with more classes of client devices using the implementation described in the computer-client discussions. Additionally, it can be the case that certain server computers and other computing devices within an organization can have the client installed to cover machine-to-machine communications.

A closely related point is that some clients interface with the network security system differently. The browser add-on clients, for example, redirect the browsers to an explicit proxy. Only the traffic needed to apply the policy to is rerouted and it is done so within the application. The traffic arriving at the network security system can have the user identity embedded in the data or within the secure tunnel headers, e.g. additional headers or SSL client side certificates in some implementations. Other clients redirect select network traffic through transparent proxies. For these connections, some traffic beyond exactly those requests needed by the policy can be routed to the network security system. Further, the user identity information is generally not within the data itself, but rather established by the client in setting up a secure tunnel to the network security system.

User identity, or user identification, in the context of this specification refers to an indicator that is provided by the network security system to the client device. It can be in the form of a token, a unique identifier such as a UUID, a public-key certificate, or the like. In some implementations, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

An encryption key or a key, as used herein, refers to a code or number which, when taken together with an encryption algorithm, defines a unique transformation used to encrypt or decrypt data.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" or "dependent on" the predecessor signal, event or value. "Responsiveness" of a given signal, event or value upon another signal, event or value is defined similarly.

System Overview

We describe a system and various implementations for providing security for network delivered services. The system and processes will be described with reference to FIG. 1 showing an architectural level schematic of a system in accordance with an implementation. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes network security system 120, management clients 131, the cloud services 140, client devices 150, and network 160. The network security system 120 includes the monitor 121, and storage 122. The storage 122 stores, among other things, content policies 181, content profiles 182, content inspection rules 183, enterprise data 184, clients 185, and user identities 186. In some implementations, storage 122 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Enterprise data 184 can include organizational data, including but not limited to, intellectual property, non-public financials, strategic plans, customer lists, personally identifiable information belonging to customers or employees, patient health data, source code, trade secrets, booking information, partner contracts, corporate plans, M&A documents, and other confidential data. In particular, the term "enterprise data" refers to a document, a file, a folder, a webpage, a collection of webpages, an image, or any other text-based document. See the discussion of FIGS. 5-6 for additional items that are typically included in the storage 122.

The network security system 120 can be viewed as providing several functionalities 125; key among them are an extraction engine 126, classification engine 127, security engine 128, management plane 129, and a data plane 130. The management clients 131 include tablet 132 and mobile 134. The cloud services 140 include the cloud service 142 and the cloud service 144. The client devices 150 include the mobile 152 and the computer 154. The mobile 152 includes an AppWrapper 157 and a VPN on demand 158. The computer 154 includes a client 155 that in turn includes the user identity 156 and a policy 159.

The interconnection of the elements of system 100 will now be described. The network 160 couples the tablet 132, the mobile 134, the mobile 152, the computer 154, the cloud service 142, the cloud service 144, and the network security system 120 in communication (indicated by solid lines). The actual communication path can be point-to-point over public and/or private networks. Some items, such as AppWrapper 157, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Monitor 121 and storage 122 can include one or more computers and computer systems coupled in communication with one another. They can also be one or more virtual computing and/or storage resources. For example, monitor 121 can be one or more Amazon EC2 instances and storage 122 can be an Amazon S3 storage. Other computing-as-service platforms such as Force.com from Salesforce, Rackspace, or Heroku could be used rather than implementing network security system 120 on direct physical computers or traditional virtual machines. Additionally, to implement the functionalities 125 one or more engines can be used and one or more points of presence (POPs) can be established. The engines can be of varying types including a workstation, server, computing cluster, blade server, server farm, or any other data processing system or computing device. The engine can be communicably coupled to the databases via a different network connection. For example, the extraction engine 126 can be coupled via the network(s) 160 (e.g., the Internet), classification engine 127 can be coupled via a direct network link and security engine 128 can be coupled by yet a different network connection. In other examples, the data plane 130 POPs can be distributed geographically and/or co-hosted with particular cloud services. Similarly, the management plane 129 POPs can be distributed geographically. The two types of POPs can be either separately hosted or co-hosted as well.

Having described the elements of FIG. 1 and their interconnections, elements of the figure will now be described in greater detail. The network security system 120 provides a variety of functionalities 125 via a management plane 129 and a data plane 130. Data plane 130 includes an extraction engine 126, a classification engine 127, and a security engine 128, according to one implementation. Other functionalities, e.g. control plane, can also be provided. These functionalities 125 collectively provide secure interfacing with the cloud services 140 by client devices 150. Although we use the term network security system to describe network security system 120, more generally the system provides application visibility and control functions as well as security.

The management clients 131 according to one implementation are computing devices with a web browser with a secure, web-delivered interface provided by the network security system 120 to define and administer content policies 181. The network security system 120 according to some implementations is a multi-tenant system, so a user of a management client can only change content policies 181 associated with her organization. In some implementations, APIs can be provided for programmatically defining and or updating policies. In such implementations, the management clients 131 can include one or more servers, e.g. a corporate identities directory such as a Microsoft Active Directory, pushing updates, and/or responding to pull requests for updates to the content policies 181. Both systems can co-exist; for example, some companies may use a corporate identities directory to automate identification of users within the organization while using a web interface for tailoring policies to their needs. Management clients are assigned roles and access to the network security system 120 data is controlled based on roles, e.g. read-only vs. read-write.

The function of the network security system 120 with respect to client devices 150 is easier to describe in conjunction with FIGS. 2-3: FIG. 2 shows the virtual network topology of a system in accordance with an implementation; FIG. 3 shows a more detailed network topology and data flow of a system in accordance with an implementation. For both figures, an attempt by a user of computer 154 to transmit 264 enterprise data 184 to cloud service 142 is shown. FIG. 2 shows a conceptual view of the transmission path with the network security system 120 serving to create a virtual network 260 intermediating transmissions between the computer 154 and the cloud service 142. FIG. 3 shows one possible network topology for the same transmission with the computer 154 coupled to an Internet service provider (ISP) network 362 (optional) which is in turn coupled to a corporate network 364 (optional) which is in turn coupled to the public network 366. The public network 366 is in turn coupled to the cloud service 142, and the network security system 120. Although FIG. 3 is one possible network topology, it remains a simplified, architectural view rather than a direct network layout. For example, the networks that the cloud service 142 and the network security system 120 operate on are not shown, e.g. the service providers (also ISPs) for both are omitted. FIG. 3 includes time stamps $t_1$ to $t_{12}$ that highlight the sequential routing order that the client 155 causes requests to the cloud service 142 to take. Of particular note is that requests, such as a web browser HTTP GET request for a URL of a cloud service, are routed atypically. Specifically, the client 155 identifies the request and causes the route to go $t_1$ to $t_4$ and into the network security system 120 rather than to the cloud service 142. The network security system 120 evaluates the content-type enclosed in enterprise data 184 against the applicable content policy before routing the request to the cloud service 142, $t_5$ to $t_6$. Notably, from the perspective of the cloud service 142, the request will go back to the network security system 120, $t_7$ to $t_8$, rather than directly to the computer 154. The network security system 120 can analyze the returned data, apply further content policies in a content dependent fashion and then return the response from the cloud service 142 to the computer 154, $t_9$ to $t_{12}$.

FIG. 3 also highlights that the client 155 is compatible with—and distinct from—existing VPN, proxy and network monitoring solutions. In FIG. 3, the network access of computer 154 is being routed using a VPN solution onto the private corporate network 364. This also means that corporate proxy, firewall, and content filtering policies can generally be applied. The corporate proxy should be configured with appropriate rules to forward chain requests to the network security system 120. Additionally while FIGS. 1-3 focus on a primarily hosted network security system 120, it is possible to have an "on premise" or enterprise hosted private solution. In such an implementation, all or portions of the network security system 120 may be completely within the corporate network.

In some implementations, the corporate administrator can configure the cloud service 142 to service requests for users of the corporation from the network security system 120. This prevents client devices 150 that are lacking the client 155 (or the counterparts for mobile) from bypassing the policies enforced by the network security system 120. As noted, other approaches to ensuring that cloud services are only accessed through the network security system 120 can be employed.

Returning to FIG. 1, a general view of how the network security system 120 functions has been provided. Companies, or more generally any individual or entity, wishing to better secure their use of network cloud services sign up with the network security system 120. Using a web-based interface and a computer device, the company can establish a policy in content policies 181 for their users. For each activity that involves manipulation of content, one or more content inspection rules are applied to the content by the network security system 120. If it is determined that the content is subject to content control i.e. it is sensitive data, then one or more security actions are triggered to prevent leakage or breach of sensitive data enclosed in the content. These approaches will both be discussed now in greater detail.

While system 100 and topologies 200-300 are described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Figure 4:
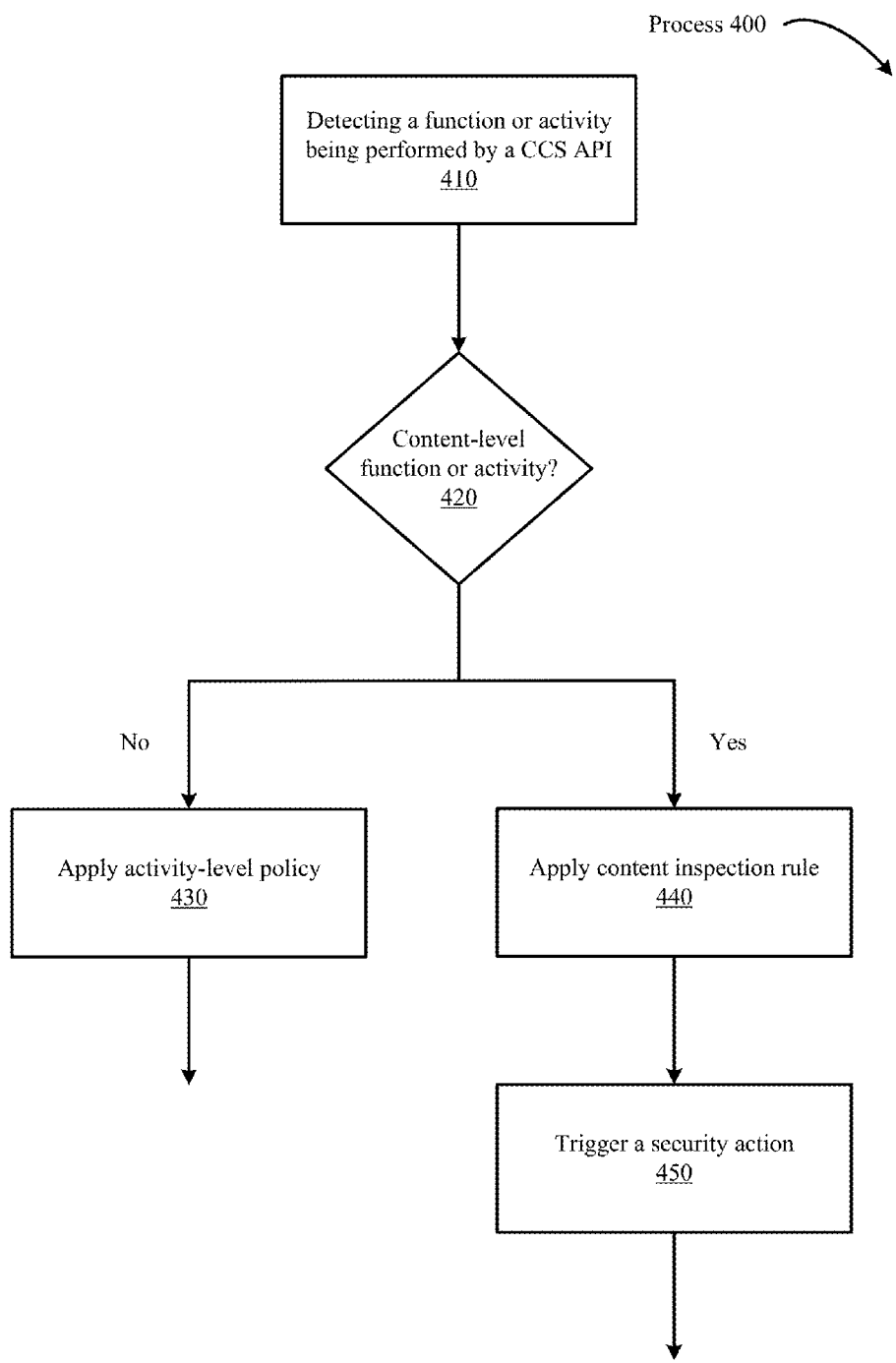
FIG. 4 is a representative method of monitoring and controlling enterprise information stored on a cloud computing service (CCS).

FIG. 4 is a representative method of monitoring and controlling enterprise information stored on a cloud computing service (CCS). Flowchart 400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 4. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, conclusion and particular implementations, etc.

FIG. 4 includes process 400 that begins at action 410, where detection of a cloud computing service (CCS) application programming interface (API) in use occurs. As discussed, infra, an algorithm-based traffic analysis is performed that discovers cloud services interfacing with an organization's network by deep inspecting services transactions in real-time, including calls made to the services. In one implementation, the CCS is hosted in at least one of a public cloud, a private cloud, and a private data center. In another implementation, the CCS is at least one of a software as a service (SaaS), an infrastructure as a service (IaaS), and a platform as a service (PaaS).

Process 400 continues at action 420 where a determination is made whether the activity being performed via the CCS API is a content-level activity. In one implementation, this is determined by evaluating an event log entry of the transaction during which the activity is performed, as discussed infra. In another implementation, an extraction engine 126 parses a data stream based on the CCS API and identifies activities that include manipulation of content, as discussed infra.

In other implementation, if the function or activity being performed is determined to be non-content-based, an activity-level policy is applied at action 430, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 440, a content inspection rule is applied to find strings and interrelated strings in the content that are subject to content control, as discussed infra. In one implementation, a classification engine 127 is used to determine if the extracted content matches the arguments defined in the applicable content inspection rule, as discussed infra.

In some implementations, the content inspection rule is applied to find strings and interrelated strings in metadata associated with content that are subject to content control, as discussed infra. In some implementations, a content inspection profile is defined based on a plurality of content inspection rules and is included in a policy applicable to the CCS. In addition, the security action is triggered based on a plurality of condition variables defined in the policy applicable to the CCS.

In one implementation, the content inspection rule includes at least one multi-part string search pattern that matches two or more non-contiguous strings that collectively identify content that is subject to content control. In some implementations, at least one subpart of the multi-part string search pattern is a custom pattern tailored to a particular customer need. In other implementations, at least one subpart of the multi-part string search pattern is a standard pattern from a data classification library.

In one implementation, the multi-part string search pattern matches the two or more non-contiguous strings based on semantic proximity between the two or more non-contiguous strings. In some implementations, the content inspection rule includes a plurality of multi-part string search patterns directed to compliance with Health Insurance Portability and Accountability Act (HIPAA) privacy or security regulations. In other implementations, the content inspection rule includes a plurality of multi-part string search patterns directed to compliance with payment card industry (PCI) data security standards. In yet other implementations, the content inspection rule includes a plurality of multi-part string search patterns directed to compliance with personally identifiable information (PII) data security standards.

In one implementation, the content inspection rule includes a plurality of multi-part string search patterns directed to trade secret data identified as confidential. In another implementation, the content inspection rule includes a plurality of multi-part string search patterns directed to source code. In yet another implementation, the content inspection rule includes a plurality of multi-part string search patterns directed to technical specifications. In a further implementation, the content inspection rule includes a plurality of multi-part string search patterns directed to customer or employee lists with financial data regarding the customer or employees.

At action 450, a security action responsive to finding the strings and interrelated strings subject to content control in the parsed stream, as discussed infra. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

In one implementation, the security action is triggered responsive to finding threshold occurrences of the strings and interrelated strings subject to content control in the parsed stream. In some implementations, the security action includes quarantining the content. In one implementation, a quarantine folder is created at the CCS in which the content is conditionally stored pending ratification or rejection by a quarantine approver. In one implementation, conditionally storing the content item in the quarantine folder includes generating data representing a tombstone file for the content that identifies the content and storing the tombstone file at a destination (file path or folder) where the uploading user desired to upload the content. In another implementation, conditionally storing the content item in the quarantine folder includes encrypting the content item. In some implementations, the quarantine folder is created in a second CCS different from the CCS to which the content could have been transmitted.

The decision of the quarantine approver regarding transmission of the content to the CCS is stored and subsequent requests for transmitting the content to the CCS are processed based on the decision of the quarantine approver. In some implementations, responsive to ratification or rejection by the quarantine approver, the tombstone file is either replaced with the content or it is deleted.

In one implementation, data identifying at least one multi-part string search pattern is generated and presented to the quarantine approver. This data identifies at least one string in the quarantined content that is subject to content control.

In some implementations, the security action includes requiring justification of using the CCS API in use for the content in the parsed stream as a condition of completing the function or the activity being performed.

In other implementations, the security action includes generating one or more coaching messages that identify a more enterprise-ready alternative to the CCS API in use. In one implementation, the enterprise-ready alternative to the CCS API is identified using a cloud confidence Index™ (CCI) that is determined based on at least one of data encryption policies of a CCS, disaster management policies of the CCS, number of data centers supporting the CCS, and compliance certifications of the data centers.

In some implementations, the security action includes document specific encryption of the content. In one implementation, the document specific encryption includes accessing a key-manager with a triplet of organization identifier, application identifier and region identifier and receiving a triplet-key and a triplet-key identifier used to uniquely identify the triplet-key. For a document that has a document identifier (ID), the method further includes deriving a per-document key from a combination of the triplet-key, the document ID and a salt, using the per-document key to encrypt the document, and forwarding the encrypted document, the document ID, the salt, and the triplet-key identifier.

In some implementations, a hash key derivation function (HKDF) is used to derive the per-document key from the combination of the triplet-key, the document ID and the salt.

In one implementation, the HKDF is executed at a trusted platform module (TPM). In another implementation, it is executed at a hardware security module (HSM).

In one implementation, a document classification tag is applied to the document based on content inspection of the document and is used to control access to the document.

In one implementation, a data integrity tag is generated that authenticates integrity of the document and is persisted for use during further processing of the document.

In one implementation, the key-manager is a key management interoperability protocol (KMIP) compliant key management system.

In some implementations, the key-manager is hosted at a local data center of an organization that uses a cloud computing service (CCS).

In other implementations, the key-manager is hosted at a cloud computing service (CCS). In yet other implementations, the key-manager is region specific.

In yet another implementation, the method includes authorizing a user for decryption based on a plurality of condition variables, including at least one data classification tag. The method further includes accessing a key-manager with a key identifier and region identifier and receiving a master-key using the key identifier that uniquely identifies the master-key. For a document that has a document identifier (ID), the method includes deriving a per-document key from a combination of the master-key, the document ID and a salt, using the per-document key to decrypt the document, and forwarding the decrypted document to the user.

In some implementations, a data integrity tag associated with the document is verified. The data integrity tag authenticates integrity of the document.

In one implementation, the key identifier includes at least one of an organization identifier and an application identifier.

In some implementations, a hash key derivation function (HKDF) is used to derive the per-document key from the combination of the triplet-key, the document ID and the salt.

In one implementation, the HKDF is executed at a trusted platform module (TPM). In another implementation, it is executed at a hardware security module (HSM).

In one implementation, the key-manager is a key management interoperability protocol (KMIP) compliant key management system.

In some implementations, the key-manager is hosted at a local data center of an organization that uses a cloud computing service (CCS).

In other implementations, the key-manager is hosted at a cloud computing service (CCS). In yet other implementations, the key-manager is region specific.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

System Architecture

Figure 5:
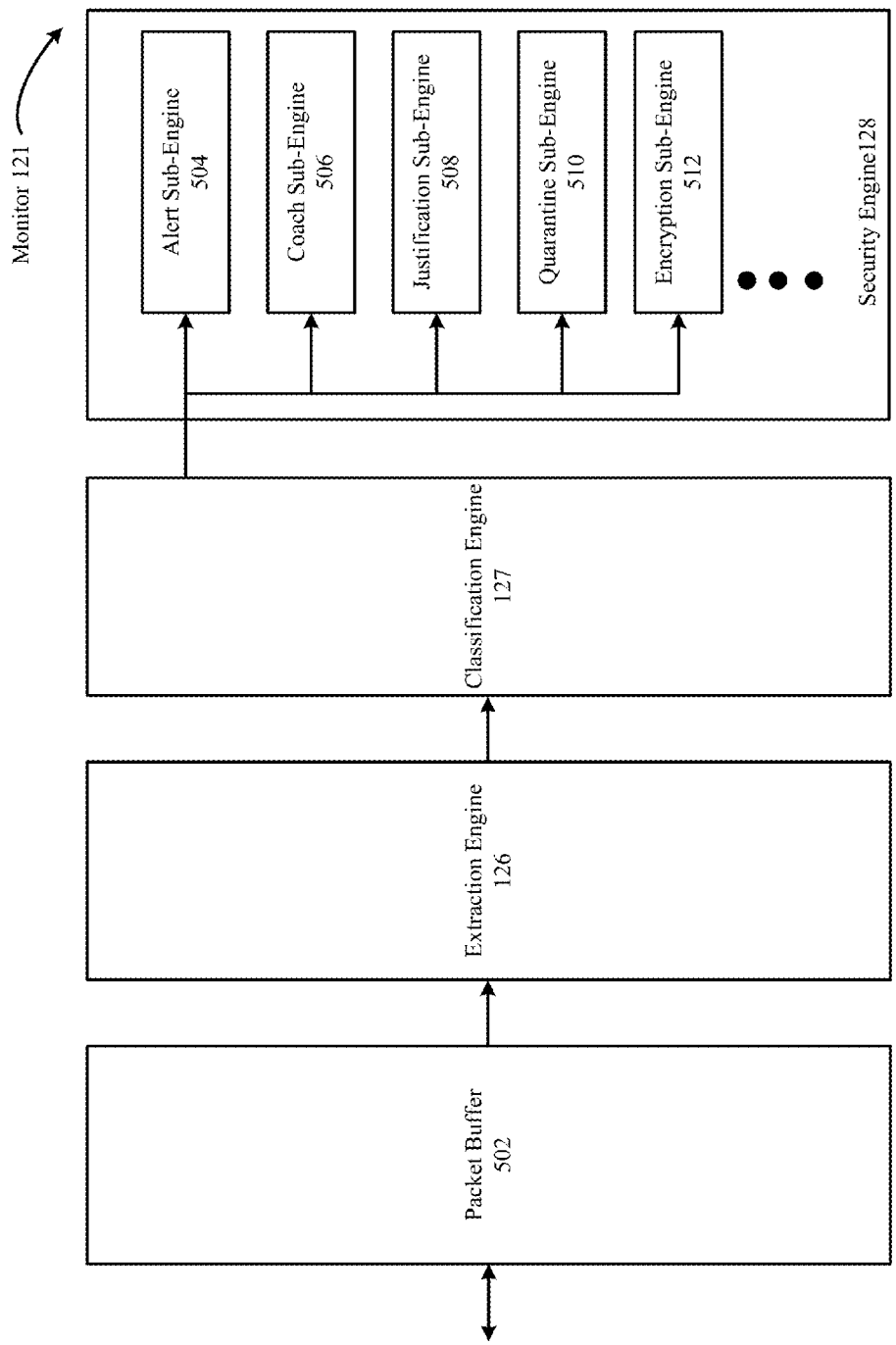
FIG. 5 illustrates a block diagram of a cross-application monitor in one implementation of the technology disclosed, showing in detail an extraction engine, a classification engine and a security engine.

Having discussed the functionality, the implementation architecture used by one implementation will be discussed in connection with FIGS. 4-6. As discussed, supra, the functionalities 125 of the network security system 120 divide into different groups: extraction engine 126, classification engine 127, security engine 128, etc. Additionally, a control plane may be used along with or instead of management plane 129 and data plane 130. The specific division of functionality between these groups is an implementation choice. Similarly, the functionality can be highly distributed across a number of points of presence (POPs) to improve locality, performance, and/or security. For example, either component of the network security system 120 can be co-located with cloud services or with corporate networks.

Monitor 121 performs content inspection (CI) on the cloud services transactions and traffic via the application programming interfaces (APIs) by identifying each of the cloud services interfacing with an organization's network. Monitor 121 can specify data packets (stored in packet buffer 502) to be inspected and content inspection rules to be applied to the data packets. In one implementation, monitor 121 can use CI to find application layer objects, SIP packets, verify media (e.g. real-time transport protocol (RTP) media) of the media packets, and otherwise inspect the packets sent through the network 160. Packets can be inspected for any suitable feature, including, packet signature, bandwidth used by packets, compression protocol, content, or other suitable features. In other implementations, CI is performed for packets in the flow of packets for a specific client 155 over the network 160 including looking at the packet headers along with the packet's payload.

Monitor 121 can employ different techniques to perform CI. In one implementation, it can use pattern matching that includes scanning for strings or generic bit and byte patterns anywhere in the packets. In another implementation, it can use behavioral analysis which includes scanning for patterns in the communication behavior of a cloud service, including absolute and relative packet sizes, per-flow data and packet rates, number of flows and new flow rate per cloud service. In yet another implementation, it can use statistical analysis that includes the calculation of statistical indicators that identify transmission types (e.g. media files, instant messages, or content transfer), including mean, median, and variation of values collected as part of the behavioral analysis.

In addition to CI, monitor 121 also performs shallow packet inspection that tracks network connections or flows by grouping all packets with a 5-tuple (source IP, destination IP, source port, destination port, and layer-4 protocol).

Following this, the extraction engine 126 extracts content from the packets stored in packet buffer 502 by parsing the traffic packets at multiple levels, including such as the physical, data link, or network layers. In particular, the extraction engine 126 can extract text and information representation from the content (e.g. a feature structure), grammatical/semantic information from the content (e.g. a parse tree that identifies watermarks in documents), or metadata about the content (e.g. in-content headers/footers, author, last modified time data, and other suitable metadata types).

In one implementation, extraction engine 126 uses parsing functions on upper-layer protocols, including FTP, SMTP, IMF, HTTP, SMB, and the like. It can also use a rich language of variable length text and/or binary phrases, such as regular expressions, to extract the application layer objects from the protocol data stream.

In other implementations, extraction engine 126 extracts complex metadata from the content that identifies structure of the content. For example, it can identify key field a message, such as "TO" and "FROM" fields of an e-mail. Other non-exhaustive examples of complex metadata include IP addresses, email addresses, recipient addresses, sender addresses, time of the e-mails, web-URLs, contact lists, instant message IP addresses, chat aliases, VOIP addresses, logins, sender and receiver of instant messages, a file name sent in an instant message or an email, a number of files transferred in the web-communication, a type of instant message text, a name of an audio and/or video attachment sent in the web-communication, a number of parties involved in a web-communication, a time of a social networking post, a size of a social networking post, a number of followers, likes, and others.

After the content is extracted, it can be organized into data sets and stored as lists, tuples, dictionaries, tables, and/or sets in in-memory data storage 122, according to one implementation. The classification engine 127 can then issue commands (e.g. SQL statements, BNF statements) to the database to retrieve and view the data. Additional programs and command can be executed to derive relationships between the data elements in the tables of the relational database. Supplementary data contained in other tables in the relational database can be combined with the extracted content, according to one implementation.

Classification engine 127 evaluates the extracted content according to the applicable content policies 181, content profiles 182, and content inspection rules 183. In one implementation, a packet can match a content inspection rule if the characteristics of the packet satisfy conditions of the content inspection rule and qualify as content subject to content control. In particular, classification engine 127 compares the extracted content with the arguments defined in the applicable standard search pattern or the custom search pattern (as discussed infra) by using a plurality of similarity measures.

The following discussion outlines some examples of the similarity measures used by the classification engine 127 to determine whether strings in extracted content match one of the applicable content inspection rules. One example of a similarity measure is unigram overlap. The baseline unigram approach considers two strings to be similar if they have higher Jaccard similarity than a threshold. The Jaccard coefficient between the unigrams is used to measure the similarity of the pair of strings. In some implementations, Jaccard similarity between two strings can be conditional upon the presence of certain essential tokens. In another implementation, an edit distance technique can be used to determine the similarity between strings. The edit distance between two strings is considered, that is, two strings are a match if the number of edits to transform one string into the other is less than some threshold value. In some implementations, a Levenshtein distance can be used as a metric for measuring the amount of difference between two strings. The distance is the minimum number of edits required in order to transform one string into the other.

In other implementations, different similarity measures can be used to determine similarity such as Euclidean distance, Cosine similarity, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms and Soergel distance.

Security engine 128 accesses content policies 181 to identify security actions to be performed. In some implementations, the security engine 128 includes a plurality of sub-engines such as alert sub-engine 504, coach sub-engine 506, justification sub-engine 508, quarantine sub-engine 510, and encryption sub-engine 512. Upon detecting content that is subject to content control, one or more of the security sub-engines are invoked based on the rules defined in the content policies 181, the content-level activity being performed, and the content-type. Other implementations can include different or more sub-engines (as represented by the three vertical dots in FIG. 5), such a block sub-engine, a bypass sub-engine, and a remediate sub-engine.

The alert sub-engine 504 sends out notifications to network administrators upon detection of potential breach or leakage of sensitive data. The coach sub-engine 506 educates the users performing the content-level activity about more secure alternative cloud services pre-sanctioned by the users' organization. The justification sub-engine 508 seeks justification from the users performing the content-level activity regarding why their particular transaction (e.g. uploading a spreadsheet) via a cloud service should be permitted. The quarantine sub-engine 510 temporarily holds the transmitted data in a quarantine folder at the cloud service pending a quarantine approver's ratification or rejection. Based on the quarantine approver's decision, the content is either transmitted to the cloud service or not. The encryption sub-engine 512 performs document specific encryption of the content by deriving a per-document key from a combination of a triplet-key using a hash key derivation function (HKDF).

While monitor 121 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Figure 6:
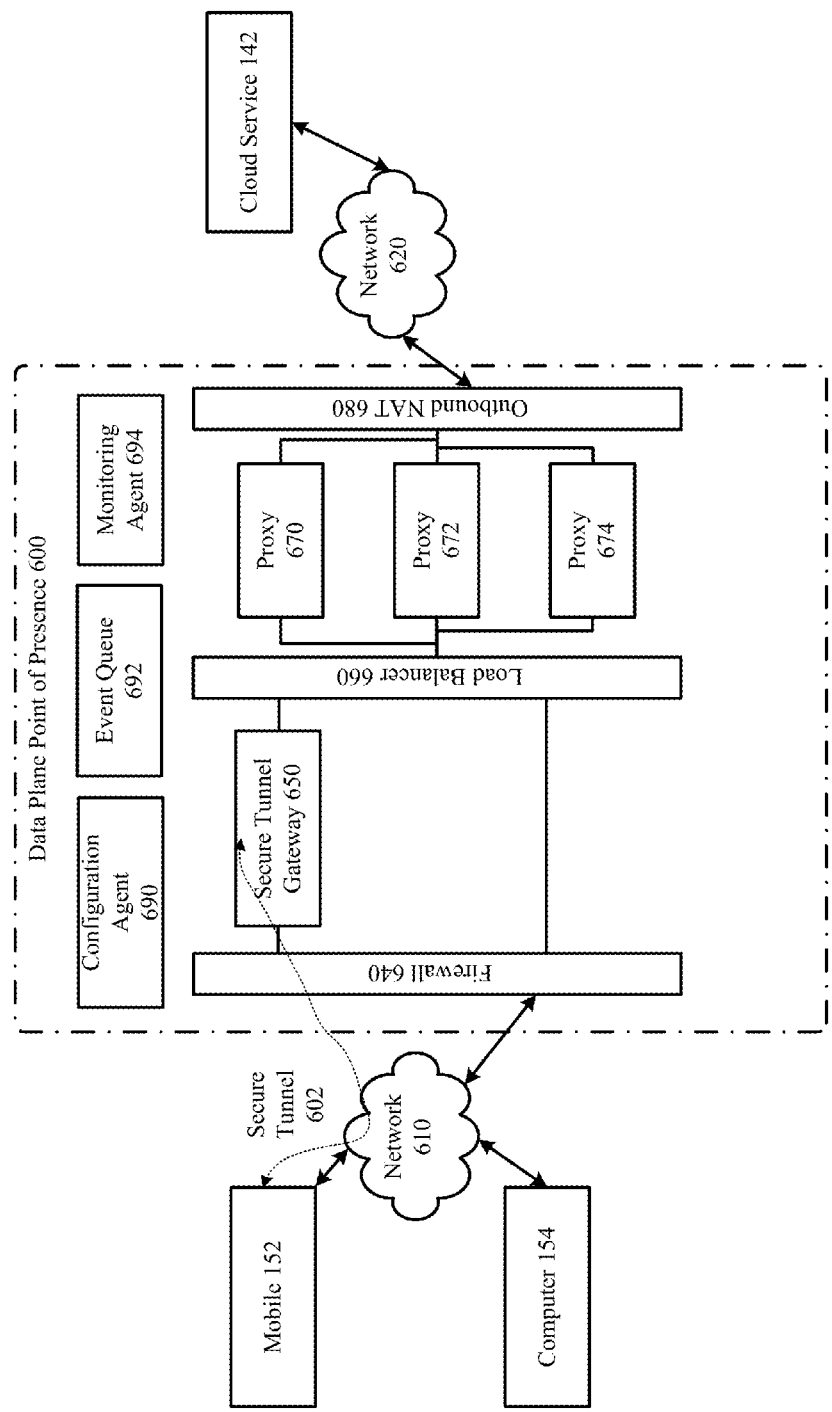
FIG. 6 portrays an architectural level schematic of a data plane point of presence.

FIG. 6 shows an architectural level schematic of a data plane point of presence (POP). FIG. 6 includes a data plane point of presence 600 (dashed-dotted box) connected to network 610 and network 620. These can be the same networks or different networks. Network 610 is also connected to client devices 150 such as mobile 152 and computer 154. Network 620 is connected to the cloud service 142. The data plane functionality is implemented according to one implementation with multiple computers, storage, and networking gear across multiple POPs such as data plane POP 600. The elements of data plane POP 600 include a firewall 640, a secure tunnel gateway 650 (see discussion of mobile clients, supra), a load balancer 660, multiple proxies 670, 672, and 674 (each proxy implements the policies according to the current configuration), and an outbound NAT 680. The architecture can be further scaled, e.g. multiple firewalls, etc. The proxies 670, 672 and 674 implement the specific policy, e.g. drop, reset, redirect, requests (or entire flows), as well as generate the logging messages.

The data plane POP 600 also includes a configuration agent 690 for receiving configuration and policy information from the management plane, an event queue 692 for recording and/or storing events to be sent to the management plane, and a monitoring agent 694 for monitoring the performance and status of the data plane POP 600. These items are generally coupled in communication with one or more management plane POPs, e.g. management plane POP 700 of FIG. 7, as well as the other elements of the data plane (not shown in order to focus on the data flow). Similarly, the configuration systems are not shown here. The difference between configuration and policy is that configuration information is information provided by the operator of the network security system 120, e.g. how many data plane POPs to have active, what version of the proxy software to load, etc., while policy information is provided by administrative users of the system, e.g. corporate IT personnel.

Also shown in FIG. 6 is an example of the secure tunnel 602 used by mobile 152 and other mobile clients. In contrast, the data from computer 154 is routed directly from the firewall 640 to the load balancer 660. As discussed some client types use secure tunnels (here one is being used for mobile) and others do not (here one without a secure tunnel is being used for the computer).

Figure 7:
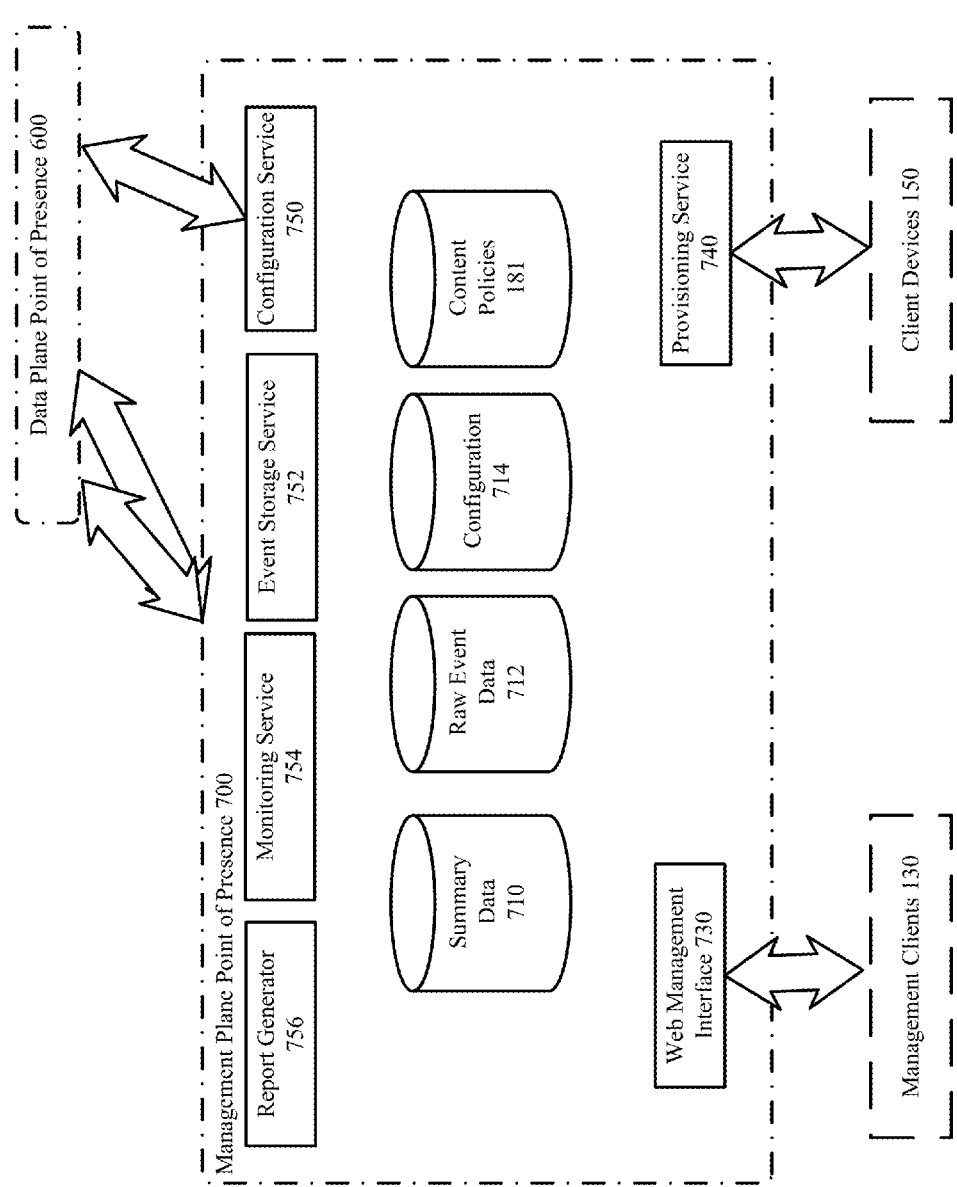
FIG. 7 depicts an architectural level schematic of a management plane point of presence.

FIG. 7 shows an architectural level schematic of a management plane point of presence. FIG. 7 includes a management plane POP 700 to implement the management plane 129 functionality. Some implementations may have only a single management plane POP, while others may have multiple POPs. The inter-relationship and communications with the data plane POP 600 are shown in FIG. 7 with large double-headed arrows. The communications between management clients 131 and the client devices 150 and the management plane POP 700 are similarly represented.

Management plane POP 700 includes: summary data 710, raw event data 712, configuration 714, policies 181, web management interface 730, provisioning service 740, configuration service 750, event storage service 752, monitoring service 754, and report generator 756. The services bridge the management/data planes: configuration service 750 communicates with configuration agent 690; event storage service 752 communicates with event queue 692; monitoring service 754 communicates with configuration agent 690. The report generator 756 is a management-plane-only item in this implementation, combing the raw event data 712 to generate summary data 710 for reporting. The web management interface 730 enables administration and reporting via web browsers. The provisioning service 740 provides client devices with the appropriate client (e.g. client 155 or VPN on demand 158 from clients 185) as discussed, supra, for configuration. The provisioning service 740 may also be responsible for providing policy updates to client devices 150. In other implementations, event storage service 752 and/or monitoring service 754 may accept data directly from cloud services and/or other sources for unified logging and reporting.

While architectures 600-700 are described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Deep API Inspection (DAPII)

The cloud service detection and content-based function or activity identification provided by the network security system 120 will be described by focusing on application layer traffic.

The technology disclosed uses an algorithm-based traffic analysis that discovers cloud services interfacing with an organization's network by deep inspecting services transactions in real-time, including calls made to the services. The technology disclosed uses connectors or standardized integrations to interpret the transactions between client 155 and cloud services 140. The transactions are decomposed to identify the activity being performed and its associated parameters. The transactions are represented as JSON files, which include a structure and format that allows the monitor 121 to both interpret what actions a user is performing in the cloud service as it is happening. So, for example, the monitor 121 can detect for an organization that "Joe from Investment Banking, currently in Japan, shared his M&A directory with an investor at a hedge fund at 10 PM".

A typical user interaction with a cloud service like Salesforce.com consists of a sequence of events that occur in the context of a session. The main events of note are: (a) login—provide user credentials to cloud service to authenticate the user; (b) application transactions—execute a set of application level transactions, e.g. upload meeting notes, add leads, or define new campaigns; and (c) log-out—this event terminates the session with the server. In this context an application session connects these interactions for the network security system. Deep API inspection logic can identify these events and link policy evaluations to each transaction boundary enabling actions to be taken. Most commonly, the application session is identified by a session cookie in the HTTP header. The network security system 120 can use the session cookie to define the session or alternately use a tuple that includes user id, user IP address, device, operating system and browser/native application to define the session.

Data Mining of Event Store and Anomaly Detection

Figure 8:
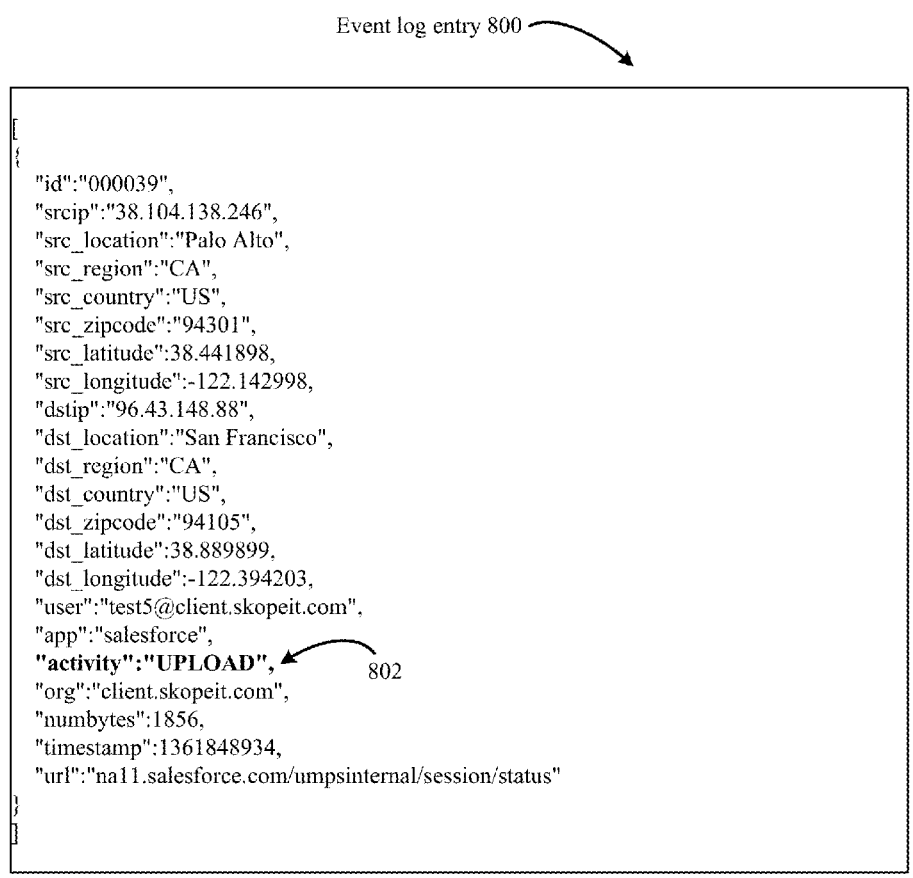
FIG. 8 is an exemplary event log entry that identifies content-level activity being performed via an API of a cloud service.

The network security system generates logging information, e.g. raw event data 712, with information gleaned from every cloud application transaction passing through the system. FIG. 8 is an exemplary event log entry including event log entry 800 in a JSON-style representation. Event log entry 800 is not exhaustive of the fields that are logged, but rather highlights key fields.

Additionally, event logs from external sources can also be provided to the network security system 120. Mining of the event data can thus accomplish several key tasks:

Identify content-based functions and activities 802 such as creating content, uploading content, posting content, and editing content.

Identify non-content-based functions and activities such as inviting users to access content, share content, and view content.

Establish a baseline usage behavior based on criteria such as: user, user groups, cloud service, cloud service groups, time of day, day of week, geo-location, bandwidth usage, and latency observed. Note the usage behaviors can be tracked per company using the system and/or across companies.

Once the baseline usage behavior is established, anomalous activities are those that do not fit the observed baseline and could be flagged for administrators to review and take action. Example anomalous activities include: user accesses from a geo-locations and/or times that do not fit the baseline and bandwidth usage by a user being very high, e.g. over two standard deviations compared to measured baseline. Notably, the rules are sensitive to roles, e.g. a user in a custom-defined sales group may be afforded greater latitude to be in a non-standard geo-location than an employee outside that group. In some implementations, some anomalous activities may also be conditions to policies that companies define specific actions, e.g. block for excessive transfer anomaly condition until an administrator approves it.

According to one implementation, the raw event data 712 is analyzed using machine-learning techniques to establish the baseline. Both supervised (rules based) and unsupervised (clustering) methods can be employed. The baseline data and anomalies can be presented in a human manageable format through the management interface. For example access patterns based on geo-location could be presented using a map interface with points representing users and cloud services and connective arcs showing the usage. According to another implementation, there is an API available to mine the raw data 712. This API can be used by partners to build value added applications using the data collected by the system. Notably, the anomalies can be tracked across multiple cloud services. For example, a download of data from one service followed by an upload to a second could be an anomaly policy that is automatically detected. Other cross service policies having to do with data integrity and security can similarly be established with suitable conditions.

Content Monitoring

The technology disclosed applies content inspection rules to find strings and interrelated strings in enterprise data that are subject to content control. The content inspection rules include at least one multi-part string search pattern that matches two or more non-contiguous strings that collectively identify content that is subject to content control. Strings can be a sequence of any data type, including text, characters, numerical, alphanumerical, Boolean expressions, etc. In one implementation, interrelated and non-contiguous strings can be explained in the context of proprietary financial data such as credit card information. Typical credit card information almost always includes a first and last name, a credit card number, and an expiry data. When these strings are detected in close proximity to each other, such as in the same data chunk, same document, or same sentence, then they are determined to constitute valid credit card information.

Content Inspection Rules

An organization can comply with a regulation such as Payment Card Information (PCI) by defining a multi-part string search pattern that looks for credit card strings within a certain semantic proximity threshold. An example multi-part string search pattern is shown below:

CreditCard_Rule:=
  {{Person/first_name, last_name} } (\w+\ W+) {1, 5}
    {{Number/CC}}
  /*look for first names and last names and credit card
    numbers within five words of each other*/
Standard Search Pattern In some implementations, at least one subpart of the multi-part string search pattern is a standard pattern predefined by a data classification library. The standard search patterns serve as regular expressions that can be used to detect the presence of different content-types. When parameter values match the regular expressions, the classification engine 127 detects the particular content-type. Examples of standard patterns include Payment Card Industry information (PCI), Personally-Identifiable Information (PII), Electronic Protected Health Information (ePHI), Health Insurance Portability and Accountability Act (HIPAA), and Profanity. In one example, HIPAA is a U.S. law that applies to healthcare entities and governs the use, disclosure, and safeguarding of protected health information (PHI). In addition, HIPAA imposes requirements on covered organizations to sign agreements with their vendors that have access to PHI. In this example, a healthcare company can detect a PHI violation by creating a content profile using a predefined dictionary that includes different PHI related classifiers such as patient's name, social security number, Medicare ID, etc.

In other implementations, a plurality of pre-defined data identifiers can be used to detect specific data types. In one implementation, count thresholds can be associated with each of the data identifiers such that as if a document or dunk chunk includes matching data, given a data identifier, more than a count threshold, then the document or the dunk chunk can be identified as including sensitive data. The following list of pre-defined data identifiers is exemplary rather than exhaustive and includes: telephone numbers, SSN, SWIFT codes, VIN numbers.

Custom Search Pattern

At least one subpart of the multi-part string search pattern is a custom pattern tailored to a particular customer need. Organizations can use pattern matching, keyword search, and regular expressions (regex) to create a custom pattern that is tailored to their specific needs. For example, a document with the keyword "Netskope Confidential" can be identified as sensitive data.

In some implementations, regular expressions can be used to define custom patterns that detect specific sensitive data type. When parameter values match the regular expressions, the classification engine 127 detects the particular sensitive data.

A sample set of regular expressions operators and the pattern the operator matches according to one implementation includes the following:

| Operator | Matched Pattern |
|---|---|
| \ | Quote the next metacharacter. |
| ^ | Match the beginning of a line. |
| $ | Match the end of a line. |
| . | Match any character (except newline). |
| \| | Alternation. |
| ( ) | Used for grouping to force operator precedence. |
| [xy] | Character x or y. |
| [x-z] | The range of characters between x and z. |
| [^z] | Any character except z. |

The following table shows a sample set of regular expressions quantifiers and the pattern the quantifier matches:

| Operator | Matched Pattern |
|---|---|
| * | Match 0 or more times. |
| + | Match 1 or more times. |
| ? | Match 0 or 1 time. |
| {n} | Match exactly n times. |
| {n,} | Match at least n times. |
| {n, m} | Match at least n times, but no more than m times. |

A sample set of regular expressions metacharacters and the pattern the metacharacter matches according to one implementation includes the following:

| Operator | Matched Pattern |
|---|---|
| \t | Match tab. |
| \n | Match newline. |
| \r | Match return. |
| \f | Match form feed. |
| \a | Match alarm (bell, beep, etc.). |
| \e | Match escape. |
| \v | Match vertical tab. |
| \021 | Match octal character (e.g. 21 octal). |
| \xF0 | Match hex character (e.g. F0 hex). |
| \x{263a} | Match wide hex character (Unicode). |
| \w | Match word character (alphanumerical plus '_'). |
| \W | Match non-word character. |
| \s | Match whitespace character. This metacharacter also includes \n and \r. |
| \S | Match non-whitespace character. |
| \d | Match digit character. |
| \D | Match non-digit character. |
| \b | Match word boundary. |
| \B | Match non-word boundary. |
| \A | Match start of string (never match at line breaks). |
| \Z | Match end of string. Never match at line breaks; only match at the end of the final buffer of text submitted for matching. |

The following example shows regular expressions based custom multi-part string search pattern that detects sixteen digit credit card number:

\d{4}-?\d{4}-?\d{4}-?\d{4}

\d—Checks for digit character.

{4}—Match exactly n times. It validates that there are exactly four digits.

-?—This would validate that the digits are occasionally separated by a hyphen (-). "?" indicates 0 or 1 times. This simple regex validates that a sixteen digit number occasionally separated by "-" is detected.

Example matches—This regex would match 1234-5678-9123-4567 or 1234567891234567.

Source Code Detection

In other implementations, the custom multi-part string search pattern can detect source code, such as C++ input/output statements, C++ comments, Java parsing command-line arguments, Python print commands, and SQL statements:

```
output: cout << "string of characters";
input: cin >> variable;
/* . . . */
//
double Double.parseDouble(String s)
print test_string, 'text'
SELECT column_name,column_name
```

The following table summarizes the different content-type and the search patterns used to detect them:

| Content-type | Search Pattern |
|---|---|
| 1. Standard Pattern | Standard data classifiers such as social security numbers, credit card numbers, date of birth, first/last name, driving license numbers, Medicare ID, etc. |
| 2. Custom Pattern | Keyword search and pattern matching with proximity detection e.g. no uploading of documents that has "Company Confidential" watermark on file metadata or the header or footer. |

-continued

| Content-type | Search Pattern |
| --- | --- |
| 3. Regex | Custom rules with regular expressions e.g. detect ePHI data with ICD, NCD, and CPT codes. |
| 4. File Type | Inspect file types i.e. docx, PDF, music/video files, etc. |
| 5. Password Protected Files | Detect files that are password protected. |
| 6. Source Code | Detect transmission of source code i.e. C++, Java, Python, etc. |
| 7. Regulations | PII, PCI, PHI, HIPAA, Profanity. |
| 8. Non-regulated Data Types | Intellectual property, financial and legal terms, national ID numbers, International Bank Account Numbers (IBAN), etc. |

Content Profiles

One or more content inspection rules can be combined to define a content profile. For instance, a PCI content profile can include content inspection rules for detecting credit card information and social security data, and can be defined as follows:

PCI_Content_Profile:=
  CreditCard_Rule
  SSN_Rule

In another example, a PII content profile can include content inspection rules for detecting credit card information, social security data, and driver's license number, and can be defined as follows:

PII Content_Profile:=
  CreditCard_Rule
  SSN_Rule
  DL_Rule

Content Policies

Further, one or more content profiles can be combined to define a content policy. A content policy can be applied to any user, user group, cloud service, cloud service category, cloud service instance, geo-location, device and operating system (OS) type. The following syntax shows one example of a content policy:

All_User=Cloud_Storage, Upload_Activity, Apply PCI_Content_Profile
  All_user—Apply PCI_Content_Profile to activities of all users.
  Cloud_Storage—Apply PCI_Content_Profile to only cloud storage services.
  Upload_Activity—Apply PCI_Content_Profile to only upload activities.
  PCI_Content_Profile—Apply PCI_Content_Profile.
  Example detections—This regex would detect any credit card information or social security numbers being uploaded to a cloud storage service.

Generally a policy can be considered as testing a set of match conditions and the performing one or more actions. The most common actions are permit, block (or deny), redirect (asks client to go to another site, might prompt user to request permissions from the administrator), quarantine the data for administrative approval, log, reset (drops the TCP connection) and encrypt (data within application payload). Another action could be to invoke another external service integrated in the network security server or outside to process the data further. We will use "block" as a common example of a policy action in the below descriptions, but more generally any action can be applied as described infra.

For content policies 181, there can be a default to "permit" (or default to "deny") policy and then administrators can supplement the policy with service-, user-, and group-specific policies. If only one content policy matches, then a determination is made whether to drop, reset, or redirect a particular request (or entire flow of requests/responses). If multiple policies match, different rules can be used by the system to pick the priority, e.g. most specific policy to least specific policy (most conditions matched), first policy tested in sequence that matches (administrator can re-order), most restrictive policy outcome selected (drop wins over reset wins over redirect).

Context and Activity Aware Detection

With increasing amounts of enterprise data moving to the cloud services, identifying and protecting what's truly sensitive is a challenge. Traditional content inspection techniques can lead to false positives or false negatives. The technology disclosed uses a plurality of condition variables to set context for inspecting content and enforcing content policies. The following list of condition variables is exemplary rather than exhaustive and includes: content service, content service category, CCI, user or group, location of the user or the cloud service, time of day, device, browser, and user activity-type (e.g. upload, download, or view). Having this context in the content policies allows for precision and accuracy in identifying potential data loss scenarios and for targeted data protection.

Regarding the condition variables, condition variables are used to determine policy matches for both logging and flow actions. The policy itself can define a match in terms of condition variables tested for a simple direct match, hierarchical parent/child matches, and/or more complex logical matches.

In addition, time windows can be specified (window types may also include time/date information to narrow the window):

| Time Window Type | Description | Evaluation |
| --- | --- | --- |
| Always | Apply policy all the time. | Default value of policy in one implementation. |
| Weekly | A day of the week. | Based on calendar of the locale, e.g. Saturday. |
| Daily | A specific time within the day. | Time range in the locale, e.g. 9am-5pm. |
| User defined | A window specified by a start time and an end time. | Generally specified as a full UTC date-time range, e.g. a block during a three-day company shutdown could be specified for US operations. |

Continuing, there are network and HTTP flow condition variables:

| Variable | Description | Evaluation |
| --- | --- | --- |
| client public source IP | The public IP visible to the system. | CIDR match; can also be used for geolocation. |
| client internal source IP | The internal IP used within a NAT'ed network. | CIDR match; can also be used for geolocation; however, administrator may want it if it is from a known network. |
| http_req_resp_size | The total size in number of bytes. | Numerical thresholds. |
| http_method | The HTTP method is sometimes useful if admin wants to disable POST. | Match, e.g. against values such as: "POST"/"GET"/"PUT". |

Additionally, geolocation mapping is supported, and depending on the library/libraries used, e.g. maxmind geoip library, different condition variables may be available, e.g. city, country, region, postal code, latitude, longitude.

User-related variables are another collection of condition variables:

| Variable | Description | Evaluation |
|---|---|---|
| User identifier (or name) | User's identifier, or name, from the user identity. | Match. |
| Group identifier (or name) | A group identifier or name. | Supports hierarchical containment, e.g. vice president group is a subset of all employees group and organizational units (OU), e.g. finance group, marketing group, etc. Note, engine can shortcut user identifier matching in some cases, e.g. if group is denied then skip user checks. |
| Account name | Sometimes a user can have different SaaS accounts or SSO, in which case a SaaS account can be treated as an alias. | Match. This can also allow users to have different permissions based on roles. For example, if a user John has a general account and a sysadmin account with cloud service X, only the sysadmin account with cloud service X might be authorized to use certain sysadmin resources. |

Lastly, device and client platform condition variables are available, such as browser family (e.g., Chrome, Internet Explorer, Safari), OS family (e.g., Windows, iOS, MacOS, Linux, Android), OS subfamily (e.g. for Windows: 7 vs. Vista), device type (e.g. desktop, mobile), device subtype (e.g. for desktop: PC vs. Mac, for mobile: tablet vs. smartphone), managed vs. unmanaged (BYOD) devices.

Policy Enforcement

For content-based action policies, enforcement points may occur at multiple junctures. For example, a source IP range or country code geolocation enforcement can be applied when the connection is established, but a policy to block specific file uploads to an application would likely only be enforceable when HTTP POST data becomes available when the application identifier and resource identifier condition variables are set. Thus, key points for policy enforcement within the network security system include:

After connection establishment between the client and the network security system;
After HTTP request URL and host received;
After HTTP request header, but before request data (if any) sent;
After HTTP request data received;
After HTTP response header, but before response data sent; and
After HTTP request/response completion (connection may continue in case of pipelining).

The policy enforcement framework is also extensible to allow policy actions to be expanded beyond the described items. In some implementations, for example, custom policy actions can include selective in-line scanning of data in transition to detect and prevent data leakage. In other implementations, a policy action can invoke an anti-virus module to scan data in transit for malware and viruses. Still other implementations, dynamically to perform operations such as selective data encryption or decryption. In one implementation, the goal can be to ensure that sensitive data uploaded or stored in cloud services is encrypted. Thus encryption can occur on the network security system when data moves from the client to the cloud service and decryption can occur similarly occur on the network security system when data moves from the cloud service to the client. Still other implementations, may aid with compliance with corporate policies and government regulations, e.g. HIPAA, that require local copies of data to be encrypted. Thus, a download of records, e.g. patients, customers, could be automatically encrypted by a policy triggered by the network security system before it is provided to the requesting client. The encryption (and decryption) keys or passwords can be specified in the policy and/or the third party system. For example, all draft tax returns that are downloaded could be automatically encrypted with the last four characters of a user identifier. In still other implementations, the encryption system may have a default password for the user that is provided to the network security system. In another implementation, the encryption is based on a key or password based on the user identity. For example, the password based on the user identity could be a corporate encryption password for a common group of users. In another implementation, the key could be a common token, e.g. a group certificate.

In another implementation, encryption could be performed down at the field level. For example, only encrypting social security numbers or credit card number columns in a spreadsheet. Similarly, in another implementation, the message contents of emails might be encrypted but headers could be left alone.

Operational Modes

The content policies can be enforced in active and/or passive modes. In active mode, all user data goes through the network security system 120 and content inspection rules are applied in real-time. In passive mode, API connectors can be used to apply content inspection rules retroactively on user directories, files, and folders that already exist on cloud services sanctioned by the organization. The passive mode allows organizations to retrieve content that is resident in cloud services and has left the organization's network.

Fine-Grained Content Policies

FIGS. 9-12 highlight that the disclosed fine-grained content policies 181 based on content-type and application-level semantics are distinct from existing DLP solutions.

FIG. 9 illustrates one implementation of a content-monitor-interface 900 that can be used to set fine-grained content policies. In other implementations, interface 900 may not have the same widgets, tabs, interface elements, or interface components as those listed above and/or may have other/different widgets, tabs, interface elements, or interface components instead of, or in addition to, those listed above, such as a security action tab, a content extraction tab, etc.

The content policy shown in interface 900 applies a PCI standard search pattern to activities of all users of only cloud storage services with CCI medium or high or low. In addition, the selected PCI search pattern only applies to upload and download content-level activities. The responsive security action triggered when a content inspection rule of the PCI search pattern is matched is per document encryption of the content being attempted to be uploaded or download.

FIG. 10 shows one implementation of a content-monitor-interface 1000 that can be used to make fine-grained content policies applicable to specific entities of an organization. In other implementations, interface 1000 may not have the same widgets, tabs, interface elements, or interface components as those listed above and/or may have other/different widgets, tabs, interface elements, or interface components instead of, or in addition to, those listed above, such as a security action tab, a content extraction tab, etc.

The content policy shown in interface 1000 applies a HIPAA standard search pattern to activities of users only of the IT group that attempt to upload content to the Box cloud service. The responsive security action triggered when a content inspection rule of the HIPAA search pattern is matched is per document encryption of the content.

FIG. 11 depicts one implementation of a content-monitor-interface 1100 that can be used to apply fine-grained content policies applicable to specific cloud services. In other implementations, interface 1100 may not have the same widgets, tabs, interface elements, or interface components as those listed above and/or may have other/different widgets, tabs, interface elements, or interface components instead of, or in addition to, those listed above, such as a security action tab, a content extraction tab, etc.

The content policy shown in interface 1100 applies a Profanity standard search pattern only to the Google Drive cloud service. The responsive security action triggered when a content inspection rule of the Profanity search pattern is matched is altering a network security administrator of the given organization.

Figure 12:
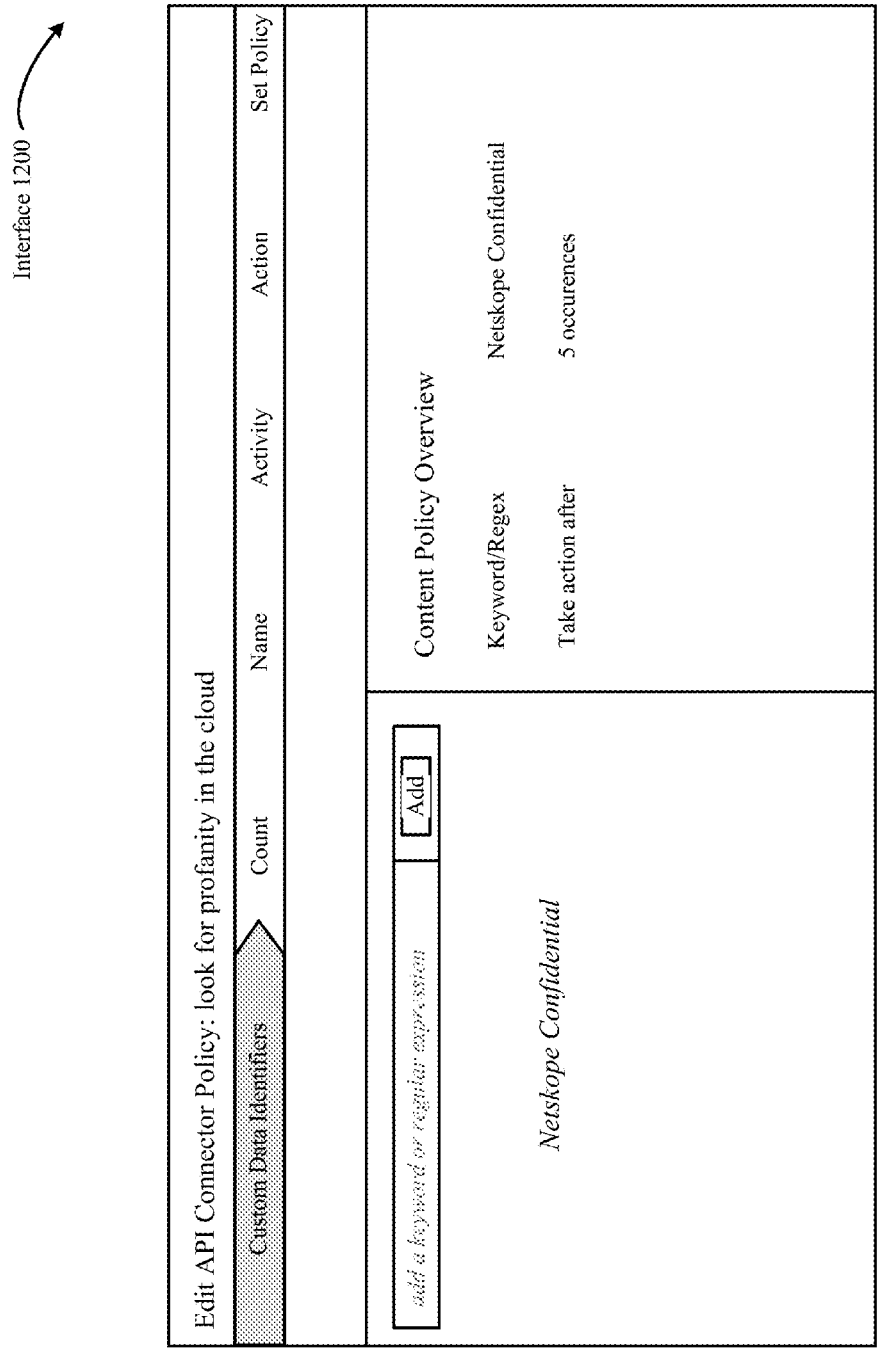
FIG. 12 is one implementation of a content-monitor-interface that can be used to set a keyword or regex based search pattern for a content inspection rule.

FIG. 12 is one implementation of a content-monitor-interface 1200 that can be used to set a keyword or regex based search pattern for a content inspection rule. In other implementations, interface 1200 may not have the same widgets, tabs, interface elements, or interface components as those listed above and/or may have other/different widgets, tabs, interface elements, or interface components instead of, or in addition to, those listed above, such as a security action tab, a content extraction tab, etc.

The content policy shown in interface 1200 applies a keyword or regex based search pattern such that when at least five occurrences of the keyword "NetSkope Confidential", or a variation of the same, are found, the content being evaluated can be considered to be sensitive data, and thus triggering appropriate security action.

Security Actions

The technology disclosed teaches a number of security actions that can be taken once the sensitive content is discovered. Content policies 181 can be set that send an alert when content matches, blocks activities such as upload, download, restrict access, change ownership, and encrypt data before it is uploaded to the cloud services.

Quarantining Content

Figure 13:
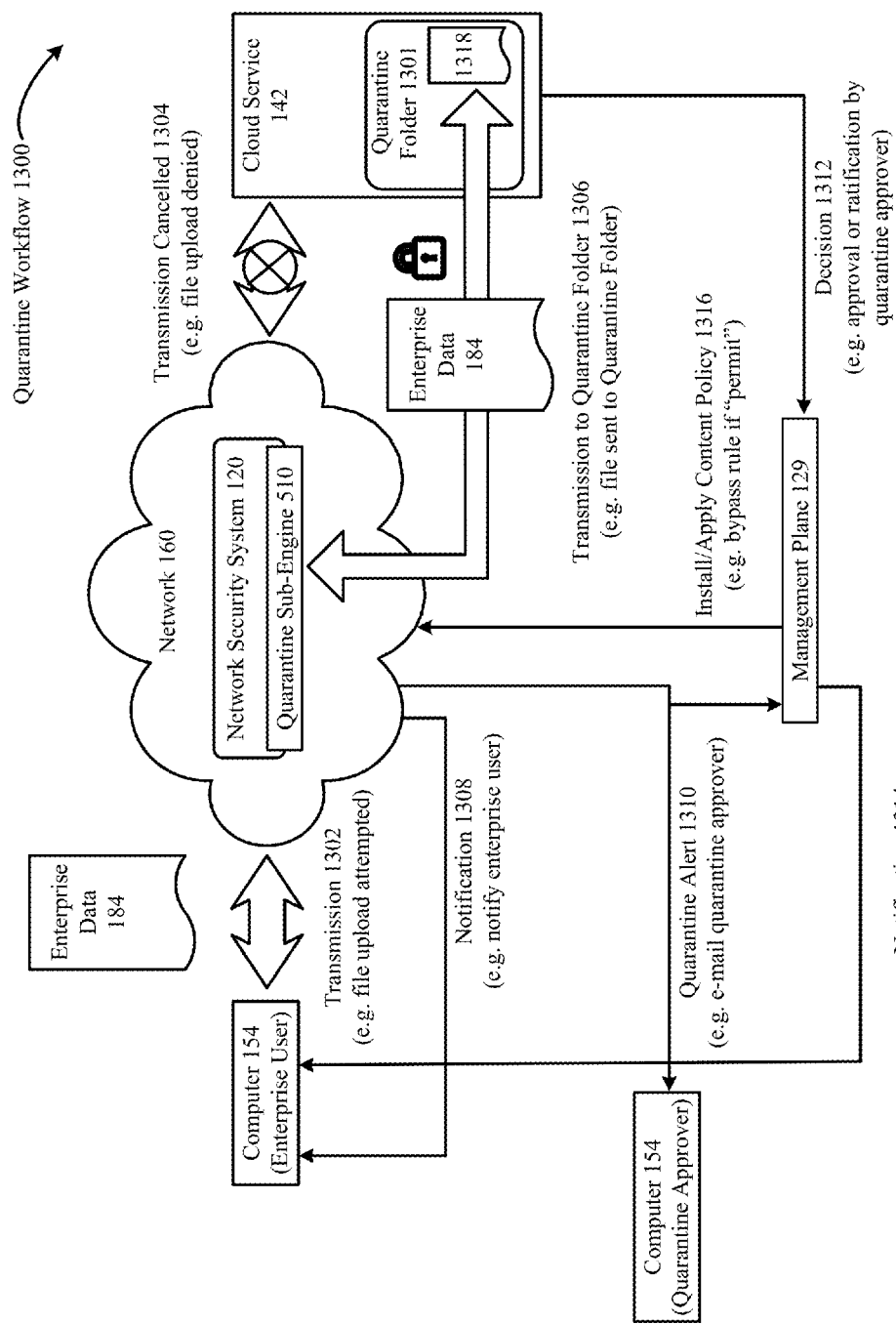
FIG. 13 illustrates one implementation of a workflow of quarantine security action.

FIG. 13 illustrates one implementation of a workflow 1300 of quarantine security action. Workflow 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this workflow is described with reference to the system that carries out a method. The system is not necessarily part of the method.

In particular, workflow 1300 shows an automated quarantine workflow that allows organizations to remediate content policy violations. When an enterprise user attempts to upload sensitive content to a cloud storage service, the quarantine sub-engine 510 can send a request to quarantine approvers (i.e., risk and compliance personnel in the organization who can approve the transaction). The sensitive information can stay in the quarantine folder until the transaction is approved, according to some implementations.

In FIG. 13, an enterprise user attempts (via computer 154) to make a content transmission 1302 (e.g. upload a file) of enterprise data 184 to a cloud service 142. Counterintuitively, the quarantine sub-engine 510 denies the upload attempt at action 1304. Instead, the quarantine sub-engine 510 generates data representing a tombstone file 1318 identifying the enterprise data 184 at action 1306. The tombstone file 1318 is used to inform the user that the actual file including the enterprise data 184 is being reviewed for conformance to enterprise policy, and the uploaded file is accessible only by a quarantine approver.

At action 1308, the enterprise user is notified of the quarantine security action. Further, at action 1310, a notification (e.g. e-mail) is sent to the quarantine approver regarding the quarantine security action via the management plane 129. Advancing further, a decision is received, at action 1312, from the quarantine approver regarding the transmission attempt 1302. If the quarantine approver ratifies the transmission attempt 1302, the tombstone file 1318 is replaced by the enterprise data 184. Otherwise, the tombstone file 1318 is deleted if the quarantine approver rejects the transmission attempt 1302.

At action 1314, the enterprise user is notified of the decision of the quarantine approver received at action 1312, and is sent further instructions regarding processing of the enterprise data 184. In some implementations, at action 1316, a content policy can be installed or applied or modified responsive to the transmission attempt 1302.

In other implementations, the actual file including the enterprise data 184 is retrieved and run through an existing DLP system in the enterprise data center to get a second verdict prior to taking the actions described above.

Coaching Enterprise Users

Figure 14:
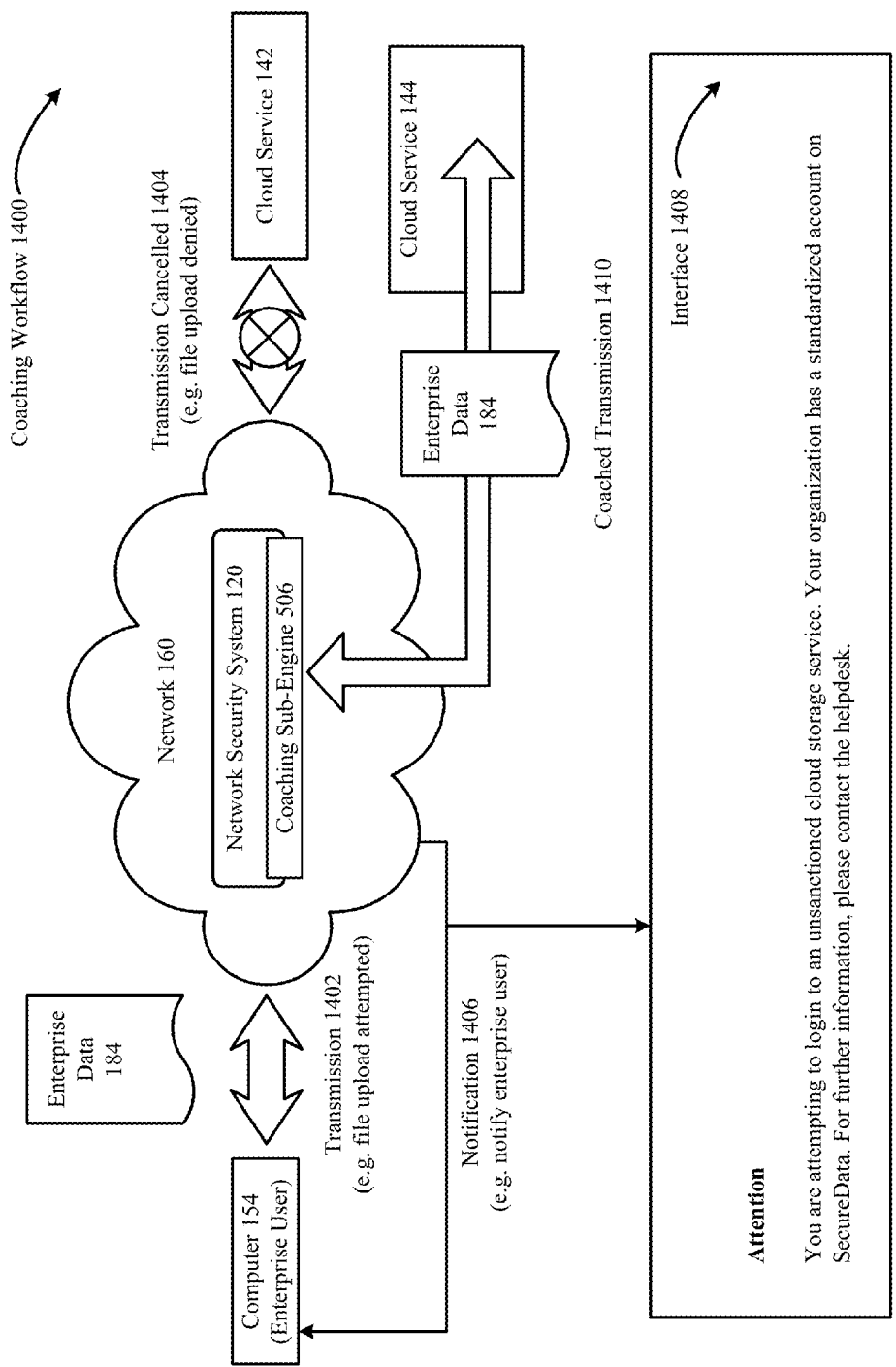
FIG. 14 depicts one implementation of a workflow of coach security action.

FIG. 14 depicts one implementation of a workflow 1400 of coach security action. Workflow 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this workflow is described with reference to the system that carries out a method. The system is not necessarily part of the method.

Coaching includes educating users about policy violations and risky behaviors and suggesting more secure and compliant alternative cloud services. In particular, coaching trains users to a desired behavior with automated messages, such as "You are uploading a sensitive document to Zippyshare. We have a corporate account with Box. Here is the URL to sign up," or even redirect the user to a complaint alternative cloud service. In other implementations, it enables users to bypass a blocked activity with a short business justification or by reporting a false positive.

In particular, workflow 1400 shows automated coaching of the enterprise users. If a violation of a content policy is detected during a content-level activity, a notification can be sent to the enterprise user that redirects the user to a process or workflow that is more appropriate to the user's organization's security policies. For example—when a user tries to upload PII information to a personal Dropbox account, he or she can be re-directed to the organization's sanctioned Corporate Box account.

In FIG. 14, an enterprise user attempts (via computer 154) to make a content transmission 1402 (e.g. upload a file) of enterprise data 184 to a cloud service 142. Counterintuitively, the coaching sub-engine 506 denies the upload attempt at action 1404. Instead, the coaching sub-engine 506 generates data representing an interface 1408 that educates the enterprise user that there is another more secure cloud service alternative 144, which includes similar features and servers similar purposes as that of cloud service 142.

If the enterprise user follows the system-generated coaching message, the enterprise data is transmitted to the more secure cloud service alternative 144 at action 1410 by the coaching sub-engine 506. In one implementation, the determination of the more secure cloud service alternative is based on the CCIs of the respective cloud services.

Seeking Activity Justification

Figure 15:
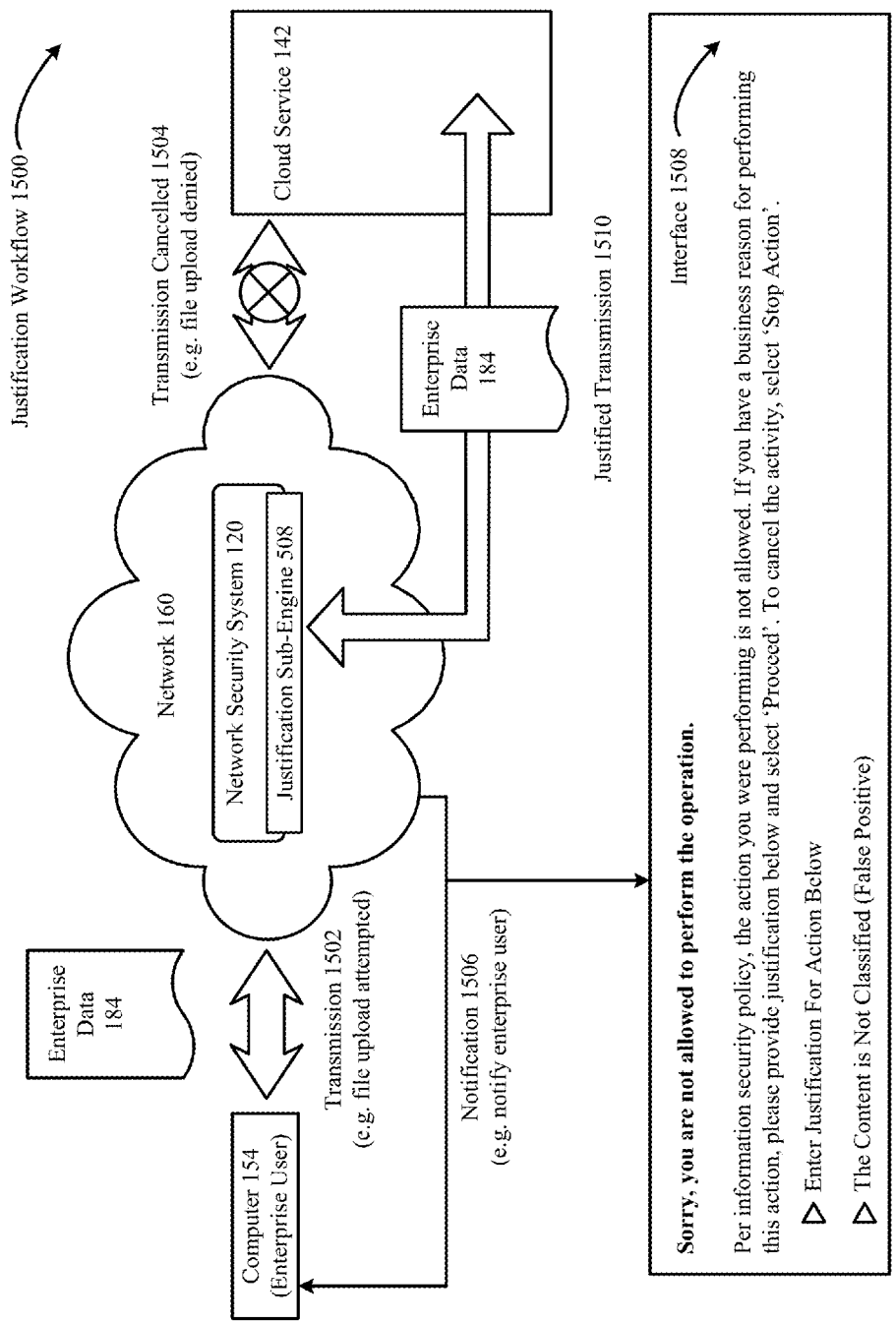
FIG. 15 shows one implementation of a workflow of justification security action.

FIG. 15 shows one implementation of a workflow 1500 of justification security action. Workflow 1500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this workflow is described with reference to the system that carries out a method. The system is not necessarily part of the method.

When a content-level activity is blocked, a custom justification page 1508 can take the enterprise user through a step by step process to mitigate risks. When the block page 1508 is presented, the enterprise user can justify the operation or tag the block as false positive or simply quit from uploading the content.

In FIG. 15, an enterprise user attempts (via computer 154) to make a content transmission 1502 (e.g. upload a file) of enterprise data 184 to a cloud service 142. Counterintuitively, the justification sub-engine 508 denies the upload attempt at action 1504. Instead, the justification sub-engine 508 generates data representing an interface 1508 that seeks justification from the enterprise user regarding the purpose and validity of the transmission 1502. Once the justification is received, the enterprise data is transmitted to the cloud service 142 at action 1510 (justified transmission) by the justification sub-engine 508. In one implementation, this allows for maintaining a record of the reasoning i.e. audit trail of the transmission 1502, and thus creates accountability among the enterprise users.

In yet other implementations, reports can be generated based on the content-policy violations. For example—an admin of an organization can create a report that shows top enterprise users violating the PCI content inspection rules, top cloud services and devices that are being used to violate PCI content inspection rules in the organization.

Per-Document Encryption

Yet another feature of the technology disclosed is per-document encryption of enterprise data 184. Per-document encryption is an example of one of the security actions that can be executed in response to detection of potential data leak. This feature allows fine-grained encryption and decryption of enterprise data 184 on a per-document basis. While such a granular approach minimizes cumulative exposure of enterprise data 184 in situations like regulatory audits and subpoenas, a major drawback of per-document encryption is that it requires storage of large number per-document encryption keys. Thus, storage of millions of per-document encryption keys for millions of documents of an organization make the existing per-document encryption techniques a management nightmare.

The per-document encryption disclosed herein solves the technical problem of inefficient key-management in granular cryptographic operations by obviating the need of storing the per-document encryption keys. Instead, the technology disclosed derives non-persistent per-document encryption keys on a real-time basis from persistent master-keys. Master-keys are orders of magnitude fewer in number than the per-document encryption keys because they are generated on per-application basis rather than per-document basis. Therefore, this granular level of encryption eliminates the need of large-scale key storage while greatly reducing the risk of unauthorized access to the enterprise data.

In addition to granular per-document encryption, the technology disclosed further minimizes exposure of enterprise data 184 by generating customized encryption keys. Customized encryption keys are customized in the sense that they are tailored to different application instances of individual organizations. The term "application instances" refers to different accounts of an organization on various cloud services. Thus, the technology disclosed maintains separate encryption keys for different accounts that an organization has on multiple cloud services.

Furthermore, the technology disclosed enhances the granularity of the encryption keys by customizing them to specific regional instances of an organization, such as Europe, Middle East and Africa, North and Central America, South America, South Pacific, etc. In other implementations, the encryption keys can be customized based on industry types, departments, user groups, product lines, or other organization-stratification criteria.

According to one implementation, per-document encryption includes generation and receipt of a master-key or a triple-key from a key-manager 1606 in response to providing the key-manager 1606 with a triplet 1604 of—(1) an organization or tenant identifier, (2) a cloud service or application identifier, and (3) a region or other organization-strata identifier. The key-manager 1606 uses the triplet 1604 to generate a triplet-key 1610 along with a unique triplet-key identifier 1608. The unique triplet-key identifier 1608 can be an ASCII value that serves as a public-key pointer that corresponds to the private triplet-key 1610, and is stored in a crypto-header 1602 of the document 184 to be encrypted. Crypto-header 1602 of the document also includes a unique document identifier 1601 along with the unique triplet-key identifier 1608. Document identifier 1601 can be in the form of a token, a unique identifier such as a UUID, a public-key certificate, or the like.

Representing a private master-key with a public-key pointer allows for liberal distribution of the encrypted document without compromising the private master-key. As a result, if a company's confidential document is compromised intentionally or unintentionally, the company's exposure is restricted to the compromised document, rather than the entire cloud service in which the compromised document is stored and to which the private master-key applies.

Per-document key is generated using a key derivation function (KDF). Specifically, encryption sub-engine 512 computes the KDF that takes as parameters the triplet-key 1604, the document identifier 1601, and a salt and generates a resulting per-document key. KDF can be a hash function SHA-256 specified in the Secure Hash Standard (SHS), published by NIST as FIPS PUB 180-4. KDF can include any function used to determine one or more encryption or decryption keys. It can take as input an input value and use the input value to generate a key. In some implementations, KDF can use a salt value, an iteration count, a load factor, and/or any other suitable parameter. Another example of a KDF is Password Based Key Derivation Function 2 (PB-KDF2, as specified in RFC 2898), described in Section 5.2 of RFC 2892 of the Internet Engineering Task Force (IETF). Yet another example is HMAC-based Extract-and-Expand Key Derivation Function (HKDF), described in Request For Comments (RFC) 5869 of the IETF. Once the per-document key is derived, it is used to encrypt the document as per the AES 256-bit encryption algorithm, according to one implementation.

Regarding the key-manger 1606, key-manager 1606 can be a FIPS 140-2 Level 3 certified and KMIP (Key Management Interoperability Protocol)-compliant cloud-based key-manager, with an optional hardware security module (HSM). In another implementation, key-manager 1606 can be integrated with on-premise infrastructures of the companies, allowing them to centrally manage their encryption keys in-line with their in-house corporate policies. In such an implementation, the organization or tenant identifier may not be required for generating the triplet-key 1610 because the key-manger 1606 is not shared between multiple organizations.

In particular, key-manager 1606 employs a conventional encryption algorithm, e.g., the Advanced Encryption Standard (AES) or other appropriate algorithms, to transform unencrypted data (clear text) into encrypted data (cipher text). Key-manager 1606 manages encryption keys, including maintaining permissions, governing key access, providing key backup, carrying out key-archival procedures, performing client management procedures, monitoring security devices, updating keys, performing disaster recovery, and other management functions. When an authorized client requests enterprise data 184 from a particular portion of secure storage 122, key-manager 1606 retrieves the proper encryption key and supplies it to the encryption sub-engine 512 for performing the required cryptographic operation. In addition to performing encryption and decryption operations, key-manager 1606 can also perform other operations such as access control, authentication, virtualization, and secure-logging operations in certain implementations.

Figure 16A:
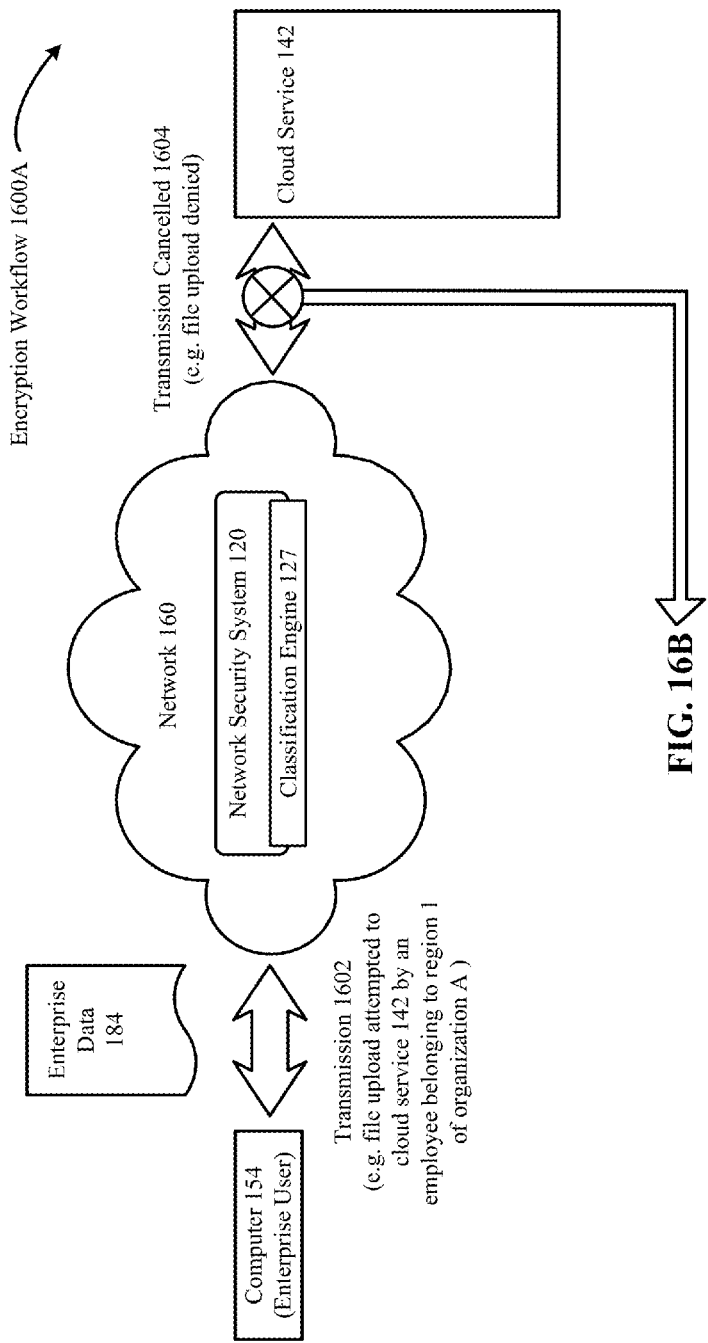
FIGS. 16A-16B are one implementation of a workflow of encrypt security action.
Figure 16B:
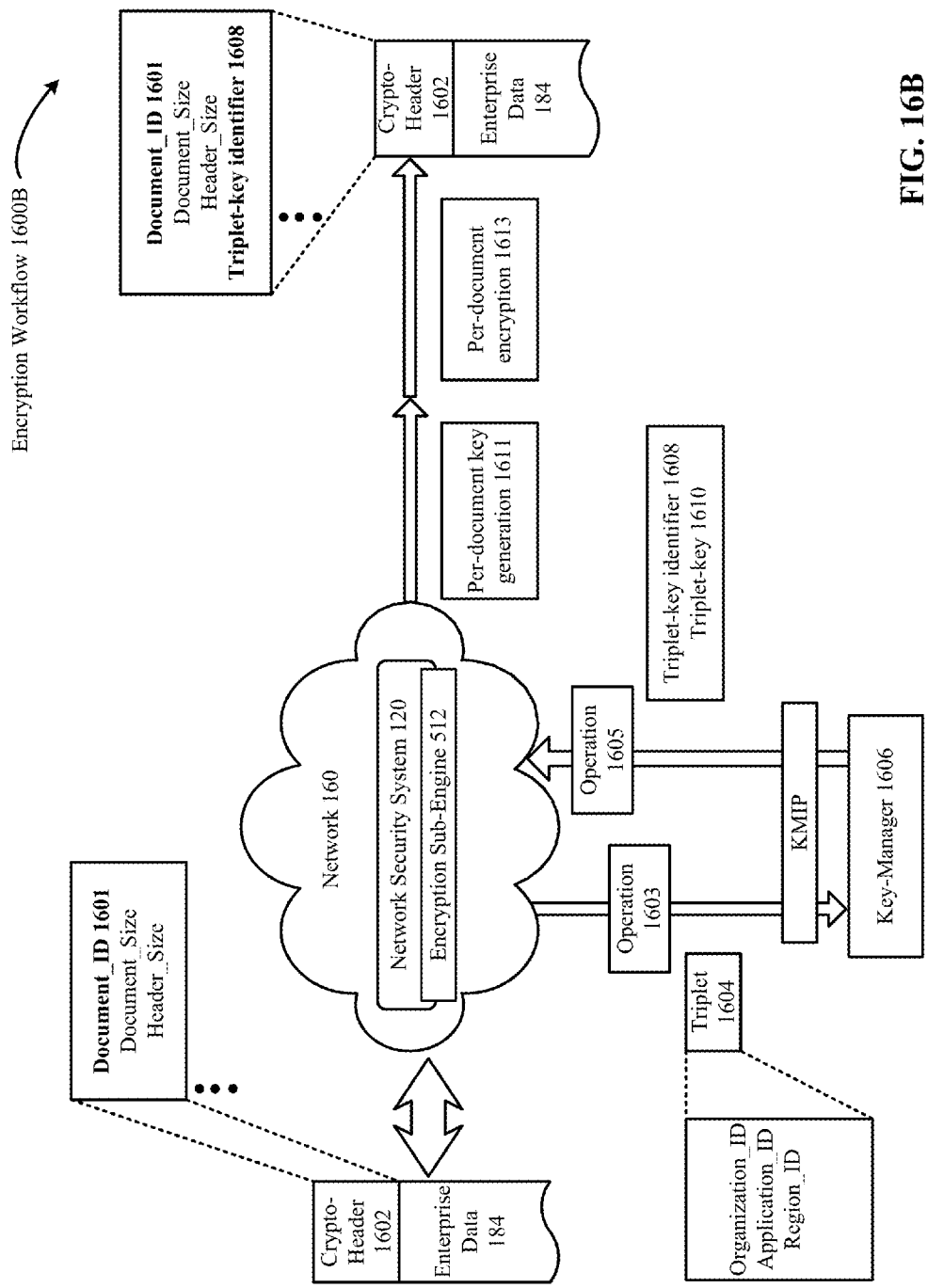

FIGS. 16A-B are one implementation of a workflow 1600A-B of encrypt security action. Workflow 1600A-B can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIGS. 16A-B. Multiple actions can be combined in some implementations. For convenience, this workflow is described with reference to the system that carries out a method. The system is not necessarily part of the method.

In FIG. 16A, an enterprise user attempts (via computer 154) to make a content transmission 1602 (e.g. upload a file) of enterprise data 184 (e.g. document) to a cloud service 142. The employee belongs to region 1 of organization A. Counterintuitively, the upload attempt is transparently denied by the classification engine 127, at action 1604, because enterprise data 184 is identified to be sensitive data subject to content control, as described supra. Instead, pursuant to the applicable content policy, enterprise data 184 is encrypted on a per-document basis, as illustrated in FIG. 16B.

In FIG. 16B, a crypto-header 1602 is added to document 184 by encryption sub-engine 512. Crypto-header 1602 includes a plurality of information that is used to implement different cryptography operations, such as encryption, checksum, and decryption. Some examples of information included in crypto-header 1602 include—unique document identifiers (Document_ID 1601), size of the crypto-header (Header_Size), size of the document (Document_Size), and version of the encryption header (Version_Number).

Advancing further, encryption sub-engine 512, at operation 1603, uses a combination of an organization identifier, an application identifier, and a region identifier, collectively referred to as triplet 1604, to receive a triplet-key 1601 and triplet-key identifier 1608 from the key-manger 1606 at operation 1605, along with a random salt. The organization identifier identifies the organization of the employee, i.e. organization A. The application identifier specifies the cloud service, i.e. cloud service 142, to which the content-level activity being performed relates. The region identifier is used determine which organization-strata the employee belongs, i.e. region 1.

Furthermore, Document_ID 1601 and triplet-key identifier 1608 are supplied to a HKDF to generate a per-document key at operation 1611. At operation 1613, document 184 is encrypted using the per-document key. In some implementations, before the encryption, a crypto-header 1602 is updated to include the triplet-key identifier 1608, which is used for decryption described in FIG. 17.

Figure 17:
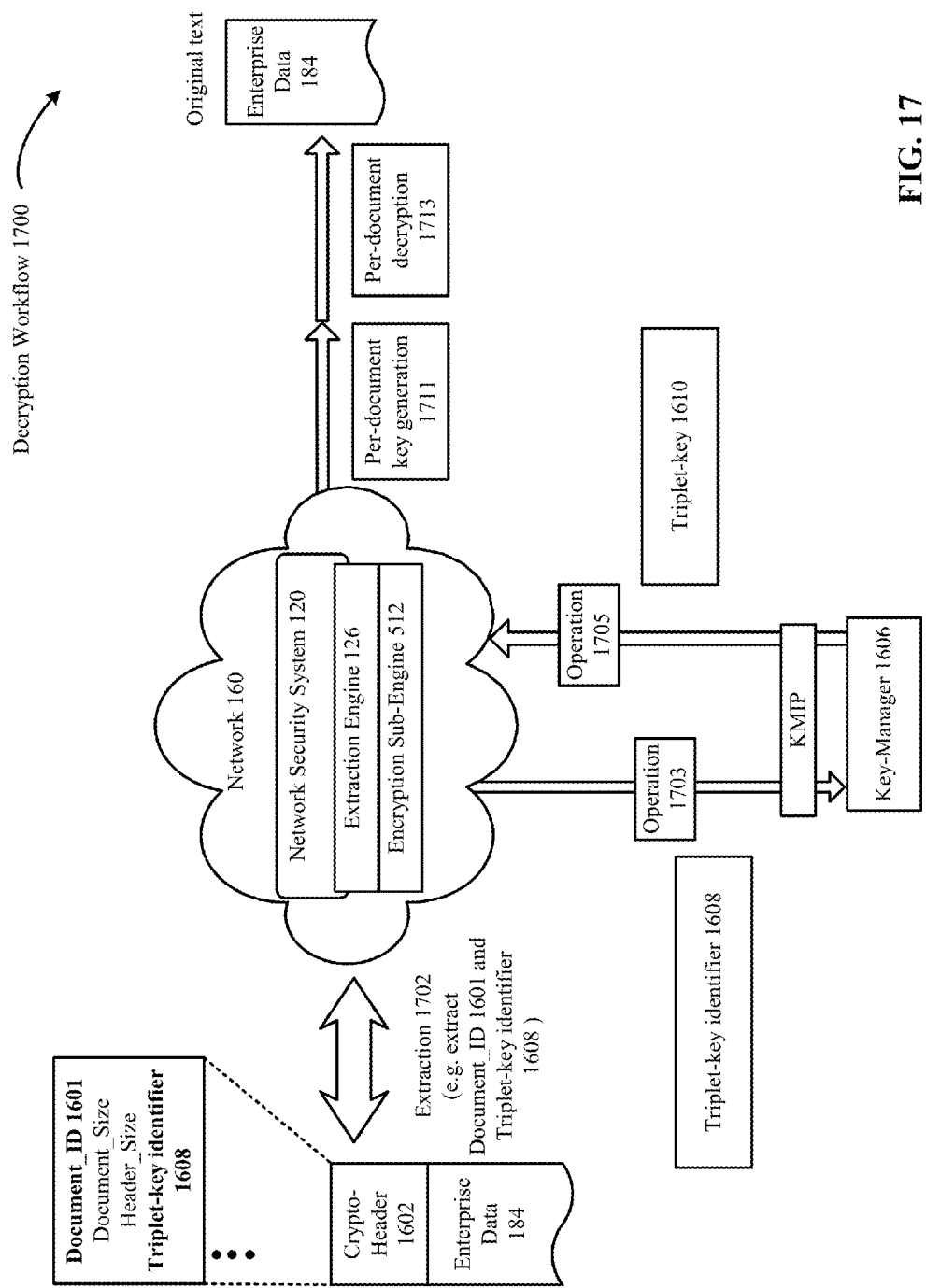
FIG. 17 is one implementation of a workflow of decryption.

FIG. 17 is one implementation of a workflow 1700 of decryption. Workflow 1700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 17. Multiple actions can be combined in some implementations. For convenience, this workflow is described with reference to the system that carries out a method. The system is not necessarily part of the method.

At extraction 1702, extraction engine 126 extracts Document_ID 1601 and triplet-key identifier 1608 from crypto-header 1602. In some implementations, a cryptographic checksum is used to verify the integrity of crypto-header 1602 and to ensure that accurate information is used to decrypt the document 184. In one implementation, the checksum can be keyed, such as Data Encryption Standard (DES) in chaining mode. In another implementation, the checksum is keyless, such as MD5, SHA-1, MD4, HAVAL, or Snefru. In other implementations, the employee is authorized for decryption based on a plurality of condition variables described above, including a data classification tag.

Advancing further, encryption sub-engine 512, at operation 1703, uses the triplet-key identifier 1608 to receive the triplet-key 1601 from the key-manger 1606 at operation 1705. Furthermore, Document_ID 1601 and triplet-key identifier 1608 are supplied to a HKDF to generate a per-document key at operation 1711. At operation 1713, document 184 is decrypted using the per-document key to produce the original document 184.

In other implementations, the HKDF operation can be performed at the HSM and only the per-document key is transmitted to the security engine 128.

FIG. 18 illustrates one implementation of a content-monitor-interface 1800 that can be used to set fine-grained content policies. In other implementations, interface 1800 may not have the same widgets, tabs, interface elements, or interface components as those listed above and/or may have other/different widgets, tabs, interface elements, or interface components instead of, or in addition to, those listed above, such as a security action tab, a content extraction tab, etc.

The content policy shown in interface 1800 triggers an encrypt security action in response to detecting transmission of sensitive data. In addition, the encrypt security action is triggered only for upload content-level activities. Moreover, the content policy only applies to Google Drive instances of the European region of an organization named Netskope.

Conclusion and Particular Implementations

We describe a system and various implementations for providing security for cloud services. As discussed, this provides for a type of virtual network between clients and cloud services with fine-grained filtering linked to content-type and application-level semantics.

Some particular implementations and features are described in the following discussion:

In one implementation, a computer-implemented method is described to monitor and control enterprise information stored on a cloud computing service (CCS). The method includes using a cross-application monitor to detect a cloud computing service (CCS) application programming interface (API) in use and a function or an activity being performed via the CCS API. The method also includes determining the function or the activity being performed via the CCS API by parsing a data stream based on the CCS API and identifying content being transmitted to the CCS. The method further includes applying a content inspection rule to find strings and interrelated strings in the content that are subject to content control and triggering a security action responsive to finding the strings and interrelated strings subject to content control in the parsed stream.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, conclusion and particular implementations, etc.

In one implementation, the security action is triggered responsive to finding threshold occurrences of the strings and interrelated strings subject to content control in the parsed stream. In another implementation, the content inspection rule is applied to find strings and interrelated strings in metadata associated with content that are subject to content control.

In some implementations, a content inspection profile is defined based on a plurality of content inspection rules and is included in a policy applicable to the CCS. In addition, the security action is triggered based on a plurality of condition variables defined in the policy applicable to the CCS.

In one implementation, the CCS is hosted in at least one of a public cloud, a private cloud, and a private data center. In another implementation, the CCS is at least one of a software as a service (SaaS), an infrastructure as a service (IaaS), and a platform as a service (PaaS).

In one implementation, the content inspection rule includes at least one multi-part string search pattern that matches two or more non-contiguous strings that collectively identify content that is subject to content control. In some implementations, at least one subpart of the multi-part string search pattern is a custom pattern tailored to a particular customer need. In other implementations, at least one subpart of the multi-part string search pattern is a standard pattern from a data classification library.

In one implementation, the multi-part string search pattern matches the two or more non-contiguous strings based on semantic proximity between the two or more non-contiguous strings. In some implementations, the content inspection rule includes a plurality of multi-part string search patterns directed to compliance with Health Insurance Portability and Accountability Act (HIPAA) privacy or security regulations. In other implementations, the content inspection rule includes a plurality of multi-part string search patterns directed to compliance with payment card industry (PCI) data security standards. In yet other implementations, the content inspection rule includes a plurality of multi-part string search patterns directed to compliance with personally identifiable information (PII) data security standards.

In one implementation, the content inspection rule includes a plurality of multi-part string search patterns directed to trade secret data identified as confidential. In another implementation, the content inspection rule includes a plurality of multi-part string search patterns directed to source code. In yet another implementation, the content inspection rule includes a plurality of multi-part string search patterns directed to technical specifications. In a further implementation, the content inspection rule includes a plurality of multi-part string search patterns directed to customer or employee lists with financial data regarding the customer or employees.

In some implementations, the security action includes quarantining the content. In one implementation, a quarantine folder is created at the CCS in which the content is conditionally stored pending ratification or rejection by a quarantine approver. In one implementation, conditionally storing the content item in the quarantine folder includes generating data representing a tombstone file for the content that identifies the content. In another implementation, conditionally storing the content item in the quarantine folder includes encrypting the content item. In some implementations, the quarantine folder is created in a second CCS different from the CCS to which the content could have been transmitted.

The decision of the quarantine approver regarding transmission of the content to the CCS is stored and subsequent requests for transmitting the content to the CCS are processed based on the decision of the quarantine approver. In some implementations, responsive to ratification or rejection by the quarantine approver, the tombstone file is either replaced with the content or it is deleted.

In one implementation, data identifying at least one multi-part string search pattern is generated and presented to the quarantine approver. This data identifies at least one string in the quarantined content that is subject to content control.

In some implementations, the security action includes requiring justification of using the CCS API in use for the content in the parsed stream as a condition of completing the function or the activity being performed.

In other implementations, the security action includes generating one or more coaching messages that identify a more enterprise-ready alternative to the CCS API in use. In one implementation, the enterprise-ready alternative to the CCS API is identified using a cloud confidence Index™ (CCI) that is determined based on at least one of data encryption policies of a CCS, disaster management policies of the CCS, number of data centers supporting the CCS, and compliance certifications of the data centers.

In some implementations, the security action includes document specific encryption of the content. In one implementation, the document specific encryption includes accessing a key-manager with a triplet of organization identifier, application identifier and region identifier and receiving a triplet-key and a triplet-key identifier used to uniquely identify the triplet-key. For a document that has a document identifier (ID), the method further includes deriving a per-document key from a combination of the triplet-key, the document ID and a salt, using the per-document key to encrypt the document, and forwarding the encrypted document, the document ID, the salt, and the triplet-key identifier.

In some implementations, a hash key derivation function (HKDF) is used to derive the per-document key from the combination of the triplet-key, the document ID and the salt.

In one implementation, a document classification tag is applied to the document based on content inspection of the document and is used to control access to the document.

In one implementation, a data integrity tag is generated that authenticates integrity of the document and is persisted for use during further processing of the document.

In one implementation, the key-manager is a key management interoperability protocol (KMIP) compliant key management system.

In some implementations, the key-manager is hosted at a local data center of an organization that uses a cloud computing service (CCS).

In other implementations, the key-manager is hosted at a cloud computing service (CCS). In yet other implementations, the key-manager is region specific.

In yet other implementations, the key-manager is at least one of a trusted platform module (TPM) and a hardware security module (HSM).

In yet another implementation, the method includes authorizing a user for decryption based on a plurality of condition variables, including at least one data classification tag. The method further includes accessing a key-manager with a key identifier and region identifier and receiving a master-key using the key identifier that uniquely identifies the master-key. For a document that has a document identifier (ID), the method includes deriving a per-document key from a combination of the master-key, the document ID and a salt, using the per-document key to decrypt the document, and forwarding the decrypted document to the user.

In some implementations, a data integrity tag associated with the document is verified. The data integrity tag authenticates integrity of the document.

In one implementation, the key identifier includes at least one of an organization identifier and an application identifier.

In some implementations, a hash key derivation function (HKDF) is used to derive the per-document key from the combination of the triplet-key, the document ID and the salt.

In one implementation, the key-manager is a key management interoperability protocol (KMIP) compliant key management system.

In some implementations, the key-manager is hosted at a local data center of an organization that uses a cloud computing service (CCS).

In other implementations, the key-manager is hosted at a cloud computing service (CCS). In yet other implementations, the key-manager is region specific.

In yet other implementations, the key-manager is at least one of a trusted platform module (TPM) and a hardware security module (HSM).

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Some implementations analyze cross-service data flows, e.g. cloud service 1 data flowing to cloud service 2.

Some implementations apply behavioral analysis on a per-user basis to identify potential intrusions and/or irregular usage.

Some implementations can identify denial-of-service attacks.

Some implementations provide service level agreement (SLA) reporting back to corporations as to whether clients were able to use the service as promised by the cloud service.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of monitoring and controlling enterprise information stored on a cloud computing service (CCS), the method including:
   using a cross-application monitor to detect:
      a cloud computing service (CCS) application programming interface (API) in use by a client; and
      a function or an activity being requested by the client via the CCS API;
   determining the function or the activity to be performed by parsing API data exchanged via the CCS API, the parsing based on the detected CCS API, and identifying content being transmitted between the client and the CCS;
   selectively applying a content inspection rule with a multi-part string search pattern, based on at least the determined function or activity, to the content being transmitted between the client and the CCS to find two or more non-contiguous strings that are within a proximity specified in the content inspection rule and that, based on the finding, are therefore subject to content control; and
   triggering a security action responsive to finding the two or more non-contiguous strings subject to content control.

2. The computer-implemented method of claim 1, further including:

triggering the security action based on a plurality of condition variables defined in a policy applicable to the CCS.

3. The computer-implemented method of claim 1, further including:
applying the content inspection rule to find strings and interrelated strings in metadata associated with content that is subject to content control.

4. The computer-implemented method of claim 1, wherein:
the content inspection rule further includes at least one multi-part string search pattern that matches two or more non-contiguous strings that collectively identify content that is subject to content control.

5. The computer-implemented method of claim 1, wherein:
at least one subpart of the multi-part string search pattern is a custom pattern tailored to a particular customer need.

6. The computer-implemented method of claim 1, wherein:
at least one subpart of the multi-part string search pattern is a standard pattern from a data classification library.

7. The computer-implemented method of claim 1, wherein:
the content inspection rule further includes a plurality of multi-part string search patterns directed to source code.

8. The computer-implemented method of claim 1, further including as the security action:
quarantining the content.

9. The computer-implemented method of claim 1, wherein quarantining the content further includes:
creating a quarantine folder at the CCS and conditionally storing the content in the quarantine folder pending ratification or rejection by a quarantine approver.

10. The computer-implemented method of claim 1, further including:
storing a decision of the quarantine approver regarding transmission of the content to the CCS; and
processing subsequent requests for transmitting the content to the CCS based on the decision of the quarantine approver.

11. The computer-implemented method of claim 1, wherein conditionally storing the content in the quarantine folder further includes:
generating data representing a tombstone file for the content that identifies the content; and
responsive to ratification or rejection by the quarantine approver, at least one of:
replacing the tombstone file with the content; and
deleting the tombstone file.

12. The computer-implemented method of claim 1, further including as the security action:
requiring justification of using the CCS API in use by the client for the content in the parsed API data as a condition of completing the function or the activity being requested by the client; and
storing and forwarding the justification for further computer-implemented processing.

13. The computer-implemented method of claim 1, further including as the security action:
document specific encryption of the content.

14. The computer-implemented method of claim 1, wherein:
the non-contiguous strings are in a same data chunk, a same document, and/or a same sentence.

15. A system of monitoring and controlling enterprise information stored on a cloud computing service (CCS), the system including:
a processor and a computer readable storage medium storing computer instructions configured to cause the processor to:
use a cross-application monitor to detect:
a cloud computing service (CCS) application programming interface (API) in use by a client; and
a function or an activity being requested by the client via the CCS API;
determine the function or the activity to be performed by parsing API data exchanged via the CCS API, the parsing based on the detected CCS API, and identifying content being transmitted between the client and the CCS;
selectively apply a content inspection rule with a multi-part string search pattern, based on at least the determined function or activity, to the content being transmitted between the client and the CCS to find two or more non-contiguous strings that are within a proximity specified in the content inspection rule and that, based on the finding, are therefore subject to content control; and
trigger a security action responsive to finding the two or more non-contiguous strings subject to content control.

16. The system of claim 15, wherein:
the content inspection rule further includes at least one multi-part string search pattern that matches two or more non-contiguous strings that collectively identify content that is subject to content control.

17. The system of claim 15, wherein:
at least one subpart of the multi-part string search pattern is a custom pattern tailored to a particular customer need.

18. The system of claim 15, wherein:
at least one subpart of the multi-part string search pattern is a standard pattern from a data classification library.

19. The system of claim 15, further configured to include as the security action:
quarantining the content.

20. One or more non-transitory computer readable media having instructions stored thereon for performing a method of monitoring and controlling enterprise information stored on a cloud computing service (CCS), the method including:
using a cross-application monitor to detect:
a cloud computing service (CCS) application programming interface (API) in use by a client; and
a function or an activity being requested by the client via the CCS API;
determining the function or the activity to be performed by parsing API data exchanged via the CCS API, the parsing based on the detected CCS API, and identifying content being transmitted between the client and the CCS;
selectively applying a content inspection rule with a multi-part string search pattern, based on at least the determined function or activity, to the content being transmitted between the client and the CCS to find two or more non-contiguous strings that are within a proximity specified in the content inspection rule and that, based on the finding, are therefore subject to content control; and triggering a security action responsive to finding the two or more non-contiguous strings subject to content control.

\* \* \* \* \*